US009090739B2

(12) United States Patent
Ieda et al.

(10) Patent No.: US 9,090,739 B2
(45) Date of Patent: Jul. 28, 2015

(54) POLYAMIDE AND POLYAMIDE COMPOSITION

(75) Inventors: Shinji Ieda, Tokyo (JP); Kazunori Terada, Tokyo (JP); Yu Nitto, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 14/001,043

(22) PCT Filed: Mar. 14, 2012

(86) PCT No.: PCT/JP2012/056588
§ 371 (c)(1),
(2), (4) Date: Oct. 1, 2013

(87) PCT Pub. No.: WO2012/124740
PCT Pub. Date: Sep. 20, 2012

(65) Prior Publication Data
US 2014/0039120 A1 Feb. 6, 2014

(30) Foreign Application Priority Data

Mar. 15, 2011 (JP) ................. 2011-056745

(51) Int. Cl.
C08G 69/26 (2006.01)
C08K 7/02 (2006.01)
C08L 77/06 (2006.01)

(52) U.S. Cl.
CPC ............. *C08G 69/26* (2013.01); *C08G 69/265* (2013.01); *C08K 7/02* (2013.01); *C08L 77/06* (2013.01)

(58) Field of Classification Search
None
See application file for complete search history.

(56) References Cited

U.S. PATENT DOCUMENTS

| 4,471,088 A | 9/1984 | Chiba et al. |
| 4,698,083 A | 10/1987 | Shioura et al. |
| 4,759,784 A | 7/1988 | Shono et al. |
| 5,378,800 A | 1/1995 | Mok et al. |
| 5,780,534 A | 7/1998 | Kleiner et al. |
| 5,965,689 A | 10/1999 | Koning et al. |
| 6,121,388 A | 9/2000 | Umetsu et al. |
| 6,133,406 A | 10/2000 | Kosaka et al. |
| 6,172,178 B1 | 1/2001 | Koning et al. |
| 6,297,345 B1 | 10/2001 | Okushita et al. |
| 7,166,687 B2 | 1/2007 | Venderbosch et al. |
| 2002/0055589 A1 | 5/2002 | Matsuoka et al. |
| 2002/0077403 A1 | 6/2002 | Gittinger et al. |
| 2003/0045621 A1 | 3/2003 | Aramaki et al. |
| 2004/0049006 A1 | 3/2004 | Aramaki et al. |
| 2004/0068090 A1 | 4/2004 | Ogawa et al. |
| 2005/0113496 A1 | 5/2005 | Saga |
| 2006/0142443 A1 | 6/2006 | Aramaki et al. |
| 2006/0264542 A1 | 11/2006 | Schneider |
| 2009/0069478 A1 | 3/2009 | Seki et al. |
| 2009/0275682 A1 | 11/2009 | Furukawa et al. |
| 2009/0281210 A1 | 11/2009 | Aramaki |
| 2009/0302272 A1 | 12/2009 | Sakata et al. |
| 2010/0098946 A1 | 4/2010 | Tashiro et al. |
| 2010/0173139 A1 | 7/2010 | Miyoshi et al. |
| 2011/0028614 A1* | 2/2011 | Shikano et al. ............... 524/126 |
| 2012/0165466 A1* | 6/2012 | Nitto et al. .................... 524/607 |
| 2012/0178876 A1 | 7/2012 | Sasaki et al. |

FOREIGN PATENT DOCUMENTS

| CA | 2065640 | 10/1992 |
| EP | 0 699 708 | 3/1996 |
| JP | 58-002327 | 1/1983 |
| JP | 64-002131 | 1/1989 |
| JP | 03-059019 | 3/1991 |
| JP | 04-013300 | 1/1992 |
| JP | 04-032775 | 2/1992 |
| JP | 5-17413 | 1/1993 |
| JP | 5-125184 | 5/1993 |
| JP | 6-32980 | 2/1994 |
| JP | 6-503590 | 4/1994 |
| JP | 08-73720 | 3/1996 |
| JP | 8-503018 | 4/1996 |
| JP | 08-333511 | 12/1996 |
| JP | 9-12868 | 1/1997 |
| JP | 10-292113 | 11/1998 |
| JP | 11-512476 | 10/1999 |
| JP | 2000-336167 | 12/2000 |
| JP | 2001-514695 | 9/2001 |
| JP | 2002-097265 | 4/2002 |
| JP | 2002-309083 | 10/2002 |

(Continued)

OTHER PUBLICATIONS

European search report issued with respect to application No. 12758039.7, mail date is Jul. 10, 2014.
European Search Report issued with respect to counterpart European Application No. 10815339.6, dated Nov. 29, 2012.
European Office Action issued with respect to counterpart European Application No. 10815339.6, dated Dec. 11, 2012.
U.S. Office Action issued with respect to related U.S. Appl. No. 13/393,299, dated Jun. 19, 2012.

(Continued)

*Primary Examiner* — Susannah Chung
*Assistant Examiner* — Robert T Butcher
(74) *Attorney, Agent, or Firm* — Greenblum & Bernstein, P.L.C.

(57) ABSTRACT (Problems to be solved)
Provision of a polyamide composition with good heat resistance, stability under heating, heat resistant color tone stability, reflow heat resistance properties and fogging properties.
(Solution)
A polyamide obtained by polymerizing (a) a dicarboxylic acid containing at least 50 mol % of an alicyclic dicarboxylic acid and (b) a diamine containing at least 50 mol % of a diamine having a pentamethylenediamine skeleton,
wherein the polyamide has a cyclic amino end content of less than 30μ equivalents/g.

17 Claims, No Drawings

(56) References Cited

FOREIGN PATENT DOCUMENTS

| | | |
|---|---|---|
| JP | 2003-2966 | 1/2003 |
| JP | 2003-119378 | 4/2003 |
| JP | 2003-138012 | 5/2003 |
| JP | 2003-292612 | 10/2003 |
| JP | 2003-292614 | 10/2003 |
| JP | 2004-75932 | 3/2004 |
| JP | 2004-149769 | 5/2004 |
| JP | 2004-211083 | 7/2004 |
| JP | 2004-075932 | 11/2004 |
| JP | 2006-273945 | 10/2006 |
| JP | 2006-522842 | 10/2006 |
| JP | 2007-291250 | 11/2007 |
| JP | 2008-38125 | 2/2008 |
| JP | 2008-221574 | 9/2008 |
| JP | 2010-111843 | 5/2010 |
| JP | 2011-042722 A | 3/2011 |
| JP | 2011-225830 | 11/2011 |
| KR | 10-2002-0008152 | 1/2002 |
| WO | 92/08754 | 5/1992 |
| WO | 94/11418 | 5/1994 |
| WO | 97/11108 | 3/1997 |
| WO | 00/58248 | 10/2000 |
| WO | 02/48239 | 6/2002 |
| WO | 2006/112205 | 10/2006 |
| WO | 2008/149862 | 12/2008 |
| WO | 2009/113590 | 9/2009 |
| WO | 2010/117098 A2 | 10/2010 |
| WO | 2011/030742 | 3/2011 |

OTHER PUBLICATIONS

Japanese Office action that issued with respect to corresponding Japanese Patent Application No. 2009-097477, mail date is Apr. 3, 2012.
Japanese Office action that issued with respect to corresponding Japanese Patent Application No. 2009-097479, mail date is Apr. 11, 2012.
U.S. Office Action issued with respect to U.S. Appl. No. 12/921,815, mail date is Mar. 14, 2011.
Search report from International Application No. PCT/JP2010/065408, mail date is Dec. 14, 2011.
International Preliminary Report on Patentability and Written Opinion for International Application No. PCT/JP2010/065408, mail date is Apr. 11, 2012.
U.S. Office Action issued with respect to U.S. Appl. No. 12/921,815, mail date is Oct. 14, 2011.
Search report from International Application No. PCT/JP2010/065284, mail date is Nov. 2, 2010.
International Preliminary Report on Patentability and Written Opinion for International Application No. PCT/JP2010/065284, mail date is Apr. 11, 2012.
International Search Report for PCT/JP2009/054693, mailed May 12, 2009.
International Preliminary Report on Patentability issued with respect to PCT/JP2009/054693, mailed Nov. 11, 2010.
Korean Office action that issued with respect to corresponding Korean Patent Application No.9-5-2012-010464251, mail date is Feb. 22, 2012.
Final U.S. Office Action issued with respect to U.S. Appl. No. 12/921,815, mail date is May 1, 2012.
U.S. Office Action issued with respect to U.S. Appl. No. 13/393,604, mail date is Oct. 16, 2013.
US Office Action issued with respect to U.S. Appl. No. 13/393,604, mail date is Jun. 13, 2014.
US Office Action issued with respect to U.S. Appl. No. 13/393,299, mail date is Jun. 16, 2014.

\* cited by examiner

POLYAMIDE AND POLYAMIDE COMPOSITION

TECHNICAL FIELD

The present invention relates to a polyamide and a polyamide composition.

BACKGROUND ART

Polyamides, represented by polyamide 6, polyamide 66 (hereinafter sometimes respectively abbreviated as "PA6" and "PA66"), and the like, have good fabricability, mechanical properties and chemical resistance, and are hence widely used as various component materials for automobile, electric and electronic products, industrial materials as well as daily and household products, and the like.

In the automotive industry, there is a demand to lighten the car body weight using a metal substitute material for the purpose of achieving the exhaust gas reduction as a countermeasure against environmental issues. To respond to such a demand, polyamide materials have been commonly used as exterior materials, interior materials, or the like, which consequently requires much higher levels of properties of polyamide materials such as heat resistance, strength, appearance, and the like. In particular, the temperature in the engine room is likely to elevate, and accordingly highly heat resistant polyamide materials have been in an increasing demand.

Further, in the electric and electronic industry for household electric appliances and the like, there is a demand for highly heat resistant polyamide materials which are resistant to an increased soldering melting point in order to meet the lead-free soldering surface mount technology (SMT).

However, the polyamides such as PA6 and PA66 described earlier have low melting points and hence fail to meet these requirements in the heat resistance.

To solve the problems of heat resistance posed by the conventional polyamides such as PA6 and PA66, high melting point polyamides have been proposed. Specifically, a polyamide composed of terephthalic acid and hexamethylenediamine (hereinafter, sometimes abbreviated as "PA6T"), and the like, are proposed.

However, PA6T is a high melting point polyamide having a melting point of about 370° C. and causes notable thermal decomposition of the polyamide when producing a molded product by the melt process which consequently makes it difficult to obtain a molded product that has sufficient properties.

To solve the problem of thermal decomposition of PA6T, proposed are high melting point semi-aromatic polyamides mainly composed of terephthalic acid and hexamethylenediamine which are allowed to have a melting point as low as about 220 to 340° C. by copolymerizing PA6T and aliphatic polyamides such as PA6 and PA66, or a noncrystalline aromatic polyamide composed of isophthalic acid and hexamethylene diamine (hereinafter sometimes abbreviated as "PA6I"), or the like, (hereinafter sometimes abbreviated as "PA6T copolymer"), and the like.

As the PA6T copolymer, Patent Document 1 discloses an aromatic polyamide composed of aromatic dicarboxylic acid and aliphatic diamine, which is a mixture of hexamethylenediamine and 2-methylpentamethylenediamine (hereinafter sometimes abbreviated as "PA6T/2 MPDT").

In addition to the aromatic polyamide composed of an aromatic dicarboxylic acid and an aliphatic diamine, a high melting point aliphatic polyamide composed of adipic acid and tetramethylenediamine (hereinafter sometimes abbreviated as "PA46"), an alicyclic polyamide composed of an alicyclic dicarboxylic acid and an aliphatic diamine, and the like, have been proposed.

For example, Patent Documents 2 and 3 disclose semi-alicyclic polyamides composed of an alicyclic polyamide composed of 1,4-cyclohexane dicarboxylic acid and hexamethylenediamine (hereinafter sometimes abbreviated as "PA6C"), and another polyamide (hereinafter sometimes abbreviated as "PA6C copolymer").

Patent Document 2 discloses that electric and electronic components made of a semi-alicyclic polyamide containing 1 to 40% of 1,4-cyclohexane dicarboxylic acid as the dicarboxylic acid unit have improved solder heat resistance, and Patent Document 3 discloses that automobile components made of a semi-alicyclic polyamide have good fluidity, toughness, and the like.

Patent Document 4 discloses that the polyamide composed of a dicarboxylic acid unit containing 1,4-cyclohexane dicarboxylic acid and a diamine unit containing 2-methyl-1,8-octane diamine has good light resistance, toughness, moldability, lightness, heat resistance, and the like. This document also discloses a method for producing such a polyamide, in which 1,4-cyclohexane dicarboxylic acid and 1,9-nonanediamine are reacted at 230° C. or less to prepare a prepolymer, which is then subjected to solid phase polymerization at 230° C. to produce a polyamide having a melting point of 311° C.

Further, Patent Document 5 discloses that the polyamide, which uses as a raw material 1,4-cyclohexane dicarboxylic acid having a trans/cis ratio from 50/50 to 97/3, has good heat resistance, low water absorbance, light resistance, and the like.

Patent Document 6 discloses that, in the production of a polyamide composed of a diamine component containing an aromatic diacid containing terephthalic acid and 2-methylpentanediamine, the cyclization of 2-methylpentamethylenediamine (a cyclic amino group is formed) is significantly reduced by adding formic acid.

Further, Patent Documents 7 and 8 disclose that, in a polypentamethylene adipamide resin, when the bonding of a cyclic amino group derived from pentamethylenediamine to a polymer end is reduced by controlling the polymerization temperature, and the like, the residence stability and heat resistance of the polyamide can be improved.

Furthermore, Patent Document 9 describes the polyamide obtained by polymerizing a dicarboxylic acid containing an alicyclic dicarboxylic acid and a diamine containing a diamine having a substituent branched from the main chain.

PRIOR ART LIST

Patent Documents

Patent Document 1: National Publication of International Patent Application No. 1994-503590
Patent Document 2: National Publication of International Patent Application No. 1999-512476
Patent Document 3: National Publication of International Patent Application No. 2001-514695
Patent Document 4: Japanese Patent Laid-Open No. 9-12868
Patent Document 5: International Publication No. WO 2002/048239
Patent Document 6: National Publication of International Patent Application No. 1996-503018
Patent Document 7: Japanese Patent Laid-Open No. 2003-292612
Patent Document 8: Japanese Patent Laid-Open No. 2004-75932

Patent Document 9: Japanese Patent Laid-Open No. 2010-111843

SUMMARY OF INVENTION

Technical Problems to be Solved

However, in spite of having the properties such as low water absorbance, high heat resistance and high chemical resistance, the PA6T copolymer described above has low fluidity and is hence insufficient from the viewpoint of moldability and surface appearance of a molded product, and also has poor toughness and light resistance. For this reason, when the PA6T copolymer is used as an exterior component, the appearance characteristic is expected, and when used for the purpose of being exposed to sunlight, or the like, the properties therefor are expected to be improved.

Further, the PA6T copolymer having a large specific gravity is also expected to be improved in respect of reducing the weight.

Specifically, PA6T/2 MPDT disclosed in Patent Document 1 can partially improve the problem posed by the conventional PA6T copolymers; however, the improvement levels in the fluidity, moldability, toughness, molded product surface appearance and light resistance are not sufficient.

Further, in spite of having good heat resistance and moldability, PA46 descried earlier has high water absorption and poses problems of significant dimensional changes and reduced mechanical properties caused by the water absorption, sometimes failing to satisfy the requirement in respect of dimensional changes required in automotive applications, and the like.

Further, the PA6C copolymers disclosed in Patent Documents 2 and 3 have high water absorption, and also pose problems such as insufficient fluidity.

Furthermore, the polyamides disclosed in Patent Documents 4 and 5 are insufficiently improved in respect of toughness, strength and fluidity.

Still furthermore, as to the polyamide disclosed in Patent Document 6, the obtention of a high molecular weight product by reducing a content of cyclic amino groups bonded to the polymer ends is described, but there is no description about the advantages provided by having more than a certain content of the cyclic amino groups bonded to the polymer ends.

Further, as to the polyamides disclosed in Patent Documents 7 and 8, there is no description about the advantages provided by having more than a certain content of the cyclic amino groups bonded to the polymer ends.

Furthermore, as to the polyamide disclosed in Patent Document 9, there is no description about the cyclic amino end or about the advantages gained by having such a structure.

As described above, all of the polyamides conventionally proposed have characteristic issues to be improved, and it is accordingly necessary to further improve the properties such as stability under heating and durability under heating to meet the requirements of the high heat resistance demanded particularly in the automotive industry and electric and electronic industry.

An object to be solved by the present invention is to provide a polyamide composition with good heat resistance, stability under heating, heat resistant color tone stability, reflow heat resistance properties and fogging properties, and a polyamide which composes such a polyamide composition.

Means for Solving the Problems

The present inventors conducted extensive studies to achieve the above object and found that the object can be achieved by a polyamide obtained by polymerizing as the primary constituent components an alicyclic dicarboxylic acid and a diamine having a pentamethylenediamine skeleton, with a predetermined cyclic amino end content as well as the polyamide composition comprising such a polyamide and a predetermined inorganic filler, whereby the present invention is accomplished.

More specifically, the present invention is as follows.

[1]

A polyamide obtained by polymerizing:

(a) a dicarboxylic acid containing at least 50 mol % of an alicyclic dicarboxylic acid; and (b) a diamine containing at least 50 mol % of a diamine having a pentamethylenediamine skeleton, wherein the polyamide has a cyclic amino end content of less than 30μ equivalents/g.

[2]

The polyamide according to the above [1], wherein the polyamide has a melting point of 280° C. or more and 350° C. or less.

[3]

The polyamide according to the above [1] or [2], wherein the polyamide has a sulfuric acid relative viscosity ηr at 25° C. of 2.3 or more.

[4]

The polyamide according to any one of the above [1] to [3], wherein the polyamide satisfies the following expression (1)

$$0.70 < \{\text{a total molecular chain end group content} - \text{an amino end content}\}/(\text{a total molecular chain end group content}) < 1.0 \quad (1).$$

[5]

The polyamide according to any one of the above [1] to [4], wherein the cyclic amino end is formed by a cyclization reaction of a diamine having a pentamethylenediamine skeleton.

[6]

The polyamide according to any one of the above [1] to [5], wherein the polyamide is obtained by a solid phase polymerization step in at least a part of a polymerization step.

[7]

A polyamide composition comprising:

a polyamide according to any one of Claims 1 to 6; and an inorganic filler.

[8]

The polyamide composition according to the above [7[ ], wherein the inorganic filler is a reinforced fiber having a weight average fiber length of 1 to 15 mm.

[9]

The polyamide according to any one of the above [1] to [5], wherein the polyamide is obtained by using (a) a dicarboxylic acid containing at least 50 mol % of an alicyclic dicarboxylic acid, and (b) a diamine containing at least 50 mol % of a diamine having a pentamethylenediamine skeleton, and carrying out a polymerization step in which a maximum ultimate pressure is 10 kg/cm$^2$ or more and a final temperature of the polymerization is a reaction temperature less than the melting point.

[10]

A method for producing a polyamide comprising a polymerization step of polymerizing:

(a) a dicarboxylic acid containing at least 50 mol % of an alicyclic dicarboxylic acid; and (b) a diamine containing at least 50 mol % of a diamine having a pentamethylenediamine skeleton, wherein, in the polymerization step, a maximum ultimate pressure is 10 kg/cm² or more and a final temperature of the polymerization is a reaction temperature less than a melting point of the polyamide.

Advantageous Effects of Invention

According to the present invention, a polyamide capable of providing a polyamide composition having good heat resistance, stability under heating, heat resistant color tone stability, reflow heat resistance properties and fogging properties and a practically sufficiently high melting point, and the polyamide composition described thereabove can be provided.

MODE FOR CARRYING OUT THE INVENTION

Hereinbelow, the embodiments to carry out the present invention (hereinafter referred to as "present embodiment") is described in detail. The present invention is not limited to the following embodiments, and can be carried out in various modifications within the spirit and scope of the invention.
[Polyamide]
The polyamide of the present embodiment is a polyamide obtained by polymerizing the following (a) and (b).
(a) A dicarboxylic acid containing at least 50 mol % of an alicyclic dicarboxylic acid.
(b) A diamine containing at least 50 mol % of a diamine having a pentamethylenediamine skeleton.
In the present specification, the polyamide means a polymer having an amide bond (—NHCO—) in the main chain.
Further, the polyamide of the present embodiment has a cyclic amino end content of less than 30μ equivalents/g.
((a) Dicarboxylic Acid)
The (a) dicarboxylic acid composing the polyamide of the present embodiment is a dicarboxylic acid containing at least 50 mol % of an alicyclic dicarboxylic acid.

When containing at least 50 mol % of an alicyclic dicarboxylic acid are used as the (a) dicarboxylic acid, the polyamide which simultaneously satisfies strength, toughness, stability under heating, and the like, and has a high melting point can be obtained. Further, the polyamide with good heat resistance, fluidity and low water absorbance can be obtained.

Examples of the alicyclic dicarboxylic acid (hereinafter sometimes referred to as (a-1) alicyclic dicarboxylic acid, or sometimes simply referred to as alicyclic dicarboxylic acid) may include alicyclic dicarboxylic acids having 3 to 10 carbon atoms, preferably 5 to 10 carbon atoms, in the alicyclic structure such as 1,4-cyclohexane dicarboxylic acid, 1,3-cyclohexane dicarboxylic acid, and 1,3-cyclopentane dicarboxylic acid.

The alicyclic dicarboxylic acid may be unsubstituted or have a substituent.

Examples of the substituent in the alicyclic dicarboxylic acids may include alkyl groups having 1 to 4 carbon atoms, such as a methyl group, an ethyl group, an n-propyl group, an isopropyl group, an n-butyl group, an isobutyl group, and a tert-butyl group.

Examples of preferable alicyclic dicarboxylic acid may include 1,4-cyclohexane dicarboxylic acid, in light of heat resistance, low water absorbance, strength, and the like.

The (a-1) alicyclic dicarboxylic acid may be used singly, or two or more may be used in combination.

The alicyclic dicarboxylic acid exists in the form of geometric isomers, a trans isomer and a cis isomer.

The alicyclic dicarboxylic acid as a raw material monomer of the polyamide may be used in either one of the trans isomer or the cis isomer, or a mixture of the trans isomer and the cis isomer in various ratios may be used.

Alicyclic dicarboxylic acid isomerizes at a high temperature to a constant ratio, and the cis isomer has higher water solubility than the trans isomer in an equivalent amount of salt with the (b) diamine(s) to be described later. Considering these aspects, alicyclic dicarboxylic acids as the raw material monomer have a trans isomer/cis isomer molar ratio of preferably 50/50 to 0/100, more preferably 40/60 to 10/90, and still more preferably 35/65 to 15/85.

The trans isomer/cis isomer ratio (molar ratio) of the alicyclic dicarboxylic acid can be determined by liquid chromatography (HPLC) or nuclear magnetic resonance spectroscopy (NMR).

Of the (a) dicarboxylic acid(s), examples of the dicarboxylic acid other than the alicyclic dicarboxylic acids (hereinafter sometimes referred to as (a-2) dicarboxylic acid other than the alicyclic dicarboxylic acid) may include aliphatic dicarboxylic acids and aromatic dicarboxylic acids.

Examples of the aliphatic dicarboxylic acid may include linear or branched saturated aliphatic dicarboxylic acids having 3 to 20 carbon atoms such as malonic acid, dimethyl malonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyl adipic acid, pimelic acid, suberic acid, azelaic acid, sebacic acid, dodecanedioic acid, tetradecanedioic acid, hexadecanedioic acid, octadecanedioic acid, eicosanedioic acid, and diglycolic acid.

Examples of the aromatic dicarboxylic acid may include aromatic dicarboxylic acids having 8 to 20 carbon atoms unsubstituted or substituted with various substituents such as terephthalic acid, isophthalic acid, naphthalene dicarboxylic acid, 2-chloroterephthalic acid, 2-methylterephthalic acid, 5-methylisophthalic acid, and sodium 5-sulfoisophthalate.

Examples of the various substituents in the aromatic dicarboxylic acids may include an alkyl group having 1 to 4 carbon atoms, an aryl group having 6 to 10 carbon atoms, an arylalkyl group having 7 to 10 carbon atoms, halogen groups such as a chloro group and a bromo group, a silyl group having 1 to 6 carbon atoms as well as a sulfonic acid group and a salt thereof such sodium salt.

In the polyamide of the present embodiment, when the (a-2) dicarboxylic acid other than the alicyclic dicarboxylic acid is copolymerized, aliphatic dicarboxylic acids are preferred, and the aliphatic dicarboxylic acids having 6 or more carbon atoms are more preferred, in light of heat resistance, fluidity, toughness, low water absorbance, strength, and the like.

Of these, the aliphatic dicarboxylic acids having 10 or more carbon atoms are preferable in light of heat resistance, low water absorbance, and the like.

Examples of the aliphatic dicarboxylic acid having 10 or more carbon atoms may include sebacic acid, dodecanedioic acid, tetradecanedioic acid, hexadecanedioic acid, octadecanedioic acid, and eicosanedioic acid. Of these, sebacic acid and dodecanedioic acid are preferable in light of heat resistance, and the like.

The (a-2) dicarboxylic acid other than the alicyclic dicarboxylic acid may be used singly, or two or more may be used in combination.

The (a) dicarboxylic acid(s) may further contain a trivalent or more polyvalent carboxylic acid such as trimellitic acid, trimesic acid, and pyromellitic acid, within a range in which the purpose of the present embodiment is not affected.

The polyvalent carboxylic acid may be used singly, or two or more may be used in combination.

The ratio (mol %) of the (a-1) alicyclic dicarboxylic acid in the (a) dicarboxylic acid(s) is at least 50 mol %. A ratio of the alicyclic dicarboxylic acid is 50 to 100 mol %, preferably 60 to 100 mol %, more preferably 70 to 100 mol %, and further preferably 100 mol %.

When the ratio of the alicyclic dicarboxylic acid is at least 50 mol %, in other words, 50 mol % or more, the polyamide can be imparted with a high melting point as well as good strength, toughness and the like.

A ratio (mol %) of (a-2) dicarboxylic acid other than the alicyclic dicarboxylic acid in the (a) dicarboxylic acid(s) is 0 to 50 mol %, preferably 0 to 40 mol %, and more preferably 0 to 30 mol %.

When an aliphatic dicarboxylic acid having 10 or more carbon atoms is contained as the (a-2) dicarboxylic acid other than the alicyclic dicarboxylic acid in the (a) dicarboxylic acid(s), preferably the (a-1) alicyclic dicarboxylic acid is 50 to 99.9 mol % and the (a-2) aliphatic dicarboxylic acid having 10 or more carbon atoms is 0.1 to 50 mol %, more preferably the (a-1) alicyclic dicarboxylic acid is 60 to 99 mol % and the (a-2) aliphatic dicarboxylic acid having 10 or more carbon atoms is 1 to 40 mol %, and further preferably the (a-1) alicyclic dicarboxylic acid is 70 to 99 mol % and the (a-2) aliphatic dicarboxylic acid having 10 or more carbon atoms is 1 to 30 mol %.

In the present embodiment, the (a) dicarboxylic acid(s) is not limited to the compounds described as the dicarboxylic acids, and may be a compound equivalent to the dicarboxylic acids described above.

The compound equivalent to the dicarboxylic acids is not particularly limited as long as it is a compound which can be the same dicarboxylic acid structure to the dicarboxylic acid structure derived from dicarboxylic acids, and examples thereof may include the anhydrides and halides of dicarboxylic acids.

((b) Diamine)

The (b) diamine(s) composing the polyamide of the present embodiment contains at least 50 mol % of a diamine having a pentamethylenediamine skeleton (hereinafter sometimes referred to as (b-1) diamine having a pentamethylenediamine skeleton).

When containing at least 50 mol % of the (b-1) diamine having a pentamethylenediamine skeleton are used as the (b) diamine(s), the polyamide which simultaneously satisfies strength, toughness, and the like, and has good moldability can be obtained.

The (b-1) diamine having the pentamethylenediamine skeleton may also be written as the diamine having the 1,5-diaminopentane skeleton.

Examples of the diamine having the pentamethylenediamine skeleton may include saturated aliphatic diamines having 5 to 20 carbon atoms such as pentamethylenediamine, 2-methylpentamethylenediamine, 2-ethylpentamethylenediamine, 3-n-butylpentamethylenediamine, 2,4-dimethylpentamethylenediamine, 2-methyl-3-ethylpentamethylenediamine and 2,2,4-trimethylpentamethylenediamine.

The (b-1) diamine having the pentamethylenediamine skeleton may also be respectively represented as 1,5-diaminopentane, 2-methyl-1,5-diaminopentane, 2-ethyl-1,5-diaminopentane, 3-n-butyl-1,5-diaminopentane, 2,4-dimethyl-1,5-diaminopentane, 2-methyl-3-ethyl-1,5-diaminopentane and 2,2,4-trimethyl-1,5-diaminopentane.

The (b-1) diamine having the pentamethylenediamine skeleton is preferably pentamethylenediamine and 2-methylpentamethylenediamine, more preferably 2-methylpentamethylenediamine, in light of heat resistance, strength, and the like.

The (b-1) diamine having the pentamethylenediamine skeleton may be used singly, or two or more may be used in combination.

Of the (b) diamine(s), examples of the diamine other than the diamine having the pentamethylenediamine skeleton (hereinafter sometimes referred to as (b-2) diamine other than the diamine having a pentamethylenediamine skeleton) may include aliphatic diamines, alicyclic diamines, and aromatic diamines.

Examples of the aliphatic diamine may include saturated aliphatic diamines having 2 to 20 carbon atoms such as ethylenediamine, propylenediamine, tetramethylenediamine, hexamethylenediamine, 2-methylhexamethylenediamine, 2,4-dimethylhexamethylenediamine, heptamethylenediamine, octamethylenediamine, nonamethylenediamine, 2-methyloctamethylenediamine, decamethylenediamine, undecamethylenediamine, dodecamethylenediamine, and tridecamethylenediamine.

The aliphatic diamine does not include the above (b-1) diamine having the pentamethylenediamine skeleton.

Examples of the alicyclic diamine (also written as cycloaliphatic diamine) may include 1,4-cyclohexanediamine, 1,3-cyclohexanediamine, and 1,3-cyclopentanediamine.

Examples of the aromatic diamine may include diamines having the aromatic structure such as metaxylylene diamine.

The (b-2) diamine other than the diamine having the pentamethylenediamine skeleton is, in light of heat resistance, fluidity, toughness, low water absorbance, strength, and the like, preferably aliphatic diamines and alicyclic diamines, more preferably linear saturated aliphatic diamines having 4 to 13 carbon atoms, further preferably linear saturated aliphatic diamines having 6 to 10 carbon atoms, and still further preferably hexamethylenediamine.

The (b-2) diamine other than the diamine having the pentamethylenediamine skeleton may be used singly, or two or more may be used in combination.

The (b) diamine(s) may further contain a trivalent or more polyvalent aliphatic amine such as bishexamethylenetriamine, within a range in which the purpose of the present embodiment is not affected.

The polyvalent aliphatic amine may be used singly, or two or more may be used in combination.

The ratio (mol %) of the (b-1) diamine having the pentamethylenediamine skeleton in the (b) diamine(s) is at least 50 mol %. A ratio of the diamine having the pentamethylenediamine skeleton is 50 to 100 mol %, preferably 60 to 100 mol %, more preferably 80 to 100 mol %, further preferably 85 to 100 mol %, still further preferably 90 to 100 mol %, and most preferably 100 mol %.

When the ratio of the (b-1) diamine having the pentamethylenediamine skeleton is at least 50 mol %, in other words, 50 mol % or more, the polyamide can be imparted with good toughness and strength.

A ratio (mol %) of the (b-2) diamine other than the diamine having the pentamethylenediamine skeleton in the (b) diamine(s) is 0 to 50 mol %, preferably 0 to 40 mol %, more preferably 0 to 20 mol %, further preferably 0 to 15 mol %, still further preferably 0 to 10 mol %, and most preferably 0 mol %.

The amount of the (a) dicarboxylic acid(s) added and the amount of the (b) diamine(s) added are preferably about the same molar amounts. For the molar ratio, in consideration of an amount of the (b) diamine(s) that escapes out to the reaction system during the polymerization reaction, the molar amount of the total (b) diamine(s) per molar amount of the total (a) dicarboxylic acid(s) is preferably 0.9 to 1.2, more preferably 0.95 to 1.1, and further preferably 0.98 to 1.05.

((c) Lactam and/or Aminocarboxylic Acid)

The polyamide of the present embodiment may be, in light of toughness, a polyamide obtained by further copolymerizing a (c) lactam and/or aminocarboxylic acid.

The (c) lactam and/or aminocarboxylic acid refers to a lactam and/or aminocarboxylic acid polymerizable to the polyamide.

When the polyamide of the present embodiment is a polyamide obtained by copolymerizing the (a) dicarboxylic acid(s), (b) diamine(s) and (c) lactam and/or aminocarboxylic acid, the (c) lactam and/or aminocarboxylic acid is preferably lactams and/or aminocarboxylic acids having 4 to 14 carbon atoms, and more preferably lactams and/or aminocarboxylic acids having 6 to 12 carbon atoms.

Examples of the lactam may include butyrolactam, pivalolactam, ε-caprolactam, caprylolactam, enantholactam, undecanolactam, and laurolactam (dodecanolactam). Of these, ε-caprolactam, laurolactam, and the like, are preferred in light of toughness, with ε-caprolactam being more preferred.

Examples of the aminocarboxylic acid may include ω-aminocarboxylic acid and α,ω-amino acids that are compounds in which the ring of the above lactam is opened.

The aminocarboxylic acid is preferably a linear or branched saturated aliphatic carboxylic acid having 4 to 14 carbon atoms with the ω position substituted with an amino group, and examples thereof may include 6-aminocaproic acid, 11-aminoundecanoic acid, and 12-aminododecanoic acid, and examples of the aminocarboxylic acid may include p-aminomethylbenzoic acid.

The (c) lactam and/or aminocarboxylic acid may be used singly, or two or more may be used in combination.

The amount (mol %) of the (c) lactam and/or aminocarboxylic acid added is preferably 0 to 20 mol % to the molar amount of the total of each monomer of the (a) dicarboxylic acid(s), (b) diamine(s) and (c) lactam and/or aminocarboxylic acid.

A combination of the (a) dicarboxylic acid(s) and (b) diamine(s) is not particularly limited, and, for example, A combination of the (a-1) at least 50 mol % of alicyclic dicarboxylic acid and the (b-1) at least 50 mol % of 2-methylpentamethylenediamine or pentamethylenediamine is preferred, a combination of the (a-1) at least 50 mol % of 1,4-cyclohexane dicarboxylic acid and the (b-1) at least 50 mol % of 2-methylpentamethylenediamine is more preferred.

When the (a) dicarboxylic acid(s) and the (b) diamine(s) in these combinations are polymerized as the polyamide components, the polyamide can have good strength, toughness and stability under heating and a high melting point.

(End Capping Agent)

The polyamide of the present embodiment, when polymerized using the (a) dicarboxylic acid(s) and (b) diamine(s) described above, and further the (c) lactam and/or aminocarboxylic acid as necessary, may use a known end capping agent to adjust the molecular weight, and the polyamide of the present embodiment may have a residue of the end capping agent at a molecular end thereof.

Examples of the end capping agent may include acid anhydrides such as monocarboxylic acids, monoamines, and phthalic anhydrides, monoisocyanates, monoacid halides, monoesters, and monoalcohols, with monocarboxylic acids and monoamines being preferable in light of thermal stability.

The end capping agent may be used singly, or two or more may be used in combination.

The monocarboxylic acid that can be used for the end capping agent is not particularly limited as long as it is reactive to an amino group, and examples thereof may include aliphatic monocarboxylic acids such as formic acid, acetic acid, propionic acid, butyric acid, valeric acid, caproic acid, caprylic acid, lauric acid, tridecyl acid, myristic acid, palmitic acid, stearic acid, pivalic acid, and isobutyric acid; alicyclic monocarboxylic acids such as cyclohexanecarboxylic acids; and aromatic monocarboxylic acids such as benzoic acid, toluic acid, α-naphthalenecarboxylic acid, β-naphthalenecarboxylic acid, methylnaphthalene carboxylic acid, and phenylacetic acid.

The monocarboxylic acid may be used singly, or two or more may be used in combination.

The monoamine that can be used as the end capping agent is not particularly limited as long as it is reactive to a carboxyl group, and examples thereof may include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; cyclic amines such as pyrrolidine, piperidine, and 3-methyl piperidine.

The monoamine may be used singly, or two or more may be used in combination.

(End Group Structure)

The polymer end of the polyamide according to the present embodiment has 1) a cyclic amino end, and may further have any of 2) an amino end, 3) a carboxylic end, 4) an end produced by an end capping agent, and 5) other ends.

The polymer end of the polyamide means an end moiety of the polymer chain of the polymer obtained by polymerizing the (a) dicarboxylic acid(s) and (b) diamine(s) (including the (c) lactam and/or aminocarboxylic acid as necessary) by an amide bond.

1) The cyclic amino end means that the polymer end is a cyclic amino group.

2) The amino end means that the polymer end is an amino group (—$NH_2$ group) and is derived from the (b) diamine(s) used as a raw material for the end of the polymer chain.

3) The carboxyl end means that the polymer end is a carboxyl group (—COOH group) and is derived from the (a) dicarboxylic acid(s) used as a raw material for the end of the polymer chain.

The cyclic amino group is a group represented by the following formula.

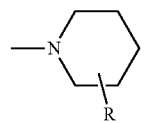

[Formula 1]

wherein R represents a hydrogen atom or an alkyl group having 1 to 4 carbon atoms such as a methyl group, an ethyl group, or a t-butyl group.

The cyclic amino end may be the piperidine structure formed when the raw material diamine having the pentamethylenediamine skeleton is cyclized by the deammonia reaction and, in such a case, R represents the alkyl group on the side chain moiety other than the pentamethylene skeleton of the diamine having the pentamethylenediamine skeleton. In the above formula, R is shown as monosubstituted but may be disubstituted, or tri- or greater substituted, to engage the side chain moiety of the diamine having the pentamethylenediamine skeleton.

4) The end produced by an end capping agent means that the polymer end is capped by the end capping agent added at the time of polymerization, and has the structure derived from the end capping agent such as monocarboxylic acids and monoamines.

5) The other ends refer to the polymer ends, which are not classified into the above 1) to 4), and examples thereof may include the end produced by the deammonia reaction of an amino end, and the end produced by the decarboxylation reaction of a carboxyl end.

The cyclic amino end content in the polyamide of the present embodiment is less than 30μ equivalents/g, preferably 2 to 15μ equivalents/g, and more preferably 4 to 10μ equivalents/g.

When the cyclic amino end content is within the above range, heat resistance, heat resistant color tone stability and fogging properties of the polyamide can be improved.

The cyclic amino end content is expressed by the number of moles of the cyclic amino end present in 1 g of the polyamide.

The cyclic amino end content can be measured using 1H-NMR as described in Examples below.

For example, the cyclic amino end content can be calculated based on an integral ratio between the hydrogen bonded to the carbon adjacent to the nitrogen atom on a piperidine ring and the hydrogen bonded to the carbon adjacent to the nitrogen atom of the amide bond in the polyamide main chain.

It is preferable for the polyamide of the present embodiment that, in the polymer end, the total content of end groups (hereinafter referred to as "total molecular chain end group content") and the content of amino group at such an end (hereinafter referred to as "amino end content") satisfy predetermined conditions.

More specifically, it is preferable that the ratio of {total molecular chain end group content−amino end content} (μmol/g) to the total molecular chain end group content (μmol/g) satisfy the following expression (1).

0.70<{total molecular chain end group content−amino end content}/total molecular chain end group content<1.0     (1)

When the above expression (1) is satisfied, the effect of heat resistant color tone stability can be attained.

In the present specification, the amino end content may also be expressed as $[NH_2]$.

When the polymer end is within the range which satisfies the above expression (1), the heat resistant color tone stability of the polyamide can be improved.

The amino end content is expressed by the number of moles of the amino end present in 1 g of the polyamide.

The amino end content can be measured using the method described in Examples below.

[Method for Producing Polyamide]

The method for producing the polyamide according to the present embodiment is not particularly limited, and examples thereof may include a method which comprises a step of polymerizing the (a) dicarboxylic acid containing at least 50 mol % of the alicyclic dicarboxylic acid and the (b) diamine containing at least 50 mol % of a diamine having a pentamethylenediamine skeleton.

It is preferable that the polyamide according to the present embodiment be a polyamide obtained by a solid phase polymerization step in at least a part of the polymerization step.

It is preferable that the method for producing the polyamide according to the present embodiment further comprise a step of increasing the degree of polymerization of the polyamide.

Examples of the method for producing the polyamide according to the present embodiment may include the following methods, but not particularly limited thereto.

1) A method wherein an aqueous solution or an aqueous suspension of a dicarboxylic acid and a diamine salt or a mixture thereof is heated and polymerized while maintaining the melt state (hereinafter, sometimes abbreviated as "hot melt polymerization").

2) A method wherein the degree of polymerization is increased while maintaining a solid state at a temperature less than the melting point of the polyamide obtained by the hot melt polymerization (hereinafter, sometimes abbreviated as "hot melt polymerization/solid phase polymerization").

3) A method wherein an aqueous solution or an aqueous suspension of a dicarboxylic acid and a diamine salt or mixture thereof is heated, and the degree of polymerization is increased by further re-melting the precipitated prepolymer with an extruder such as a kneader (hereinafter, sometimes abbreviated as "prepolymer/extrusion polymerization").

4) A method wherein an aqueous solution or an aqueous suspension of a dicarboxylic acid and a diamine salt or a mixture thereof is heated and the degree of polymerization is increased while maintaining the precipitated prepolymer in a solid state at a temperature less than the melting point of the polyamide (hereinafter, sometimes abbreviated as "prepolymer/solid phase polymerization").

5) A method wherein a dicarboxylic acid and a diamine salt or a mixture thereof is polymerized by a single stage, while maintaining a solid state (hereinafter, sometimes abbreviated as "single-stage solid phase polymerization").

6) A method wherein polymerization is conducted using a dicarboxylic acid halide equivalent to a dicarboxylic acid and a diamine (hereinafter, sometimes abbreviated as "solution method").

Preferred methods for producing the polyamide according to the present embodiment may include the 3) prepolymer/extrusion polymerization, 4) prepolymer/solid phase polymerization and 5) single-stage solid phase polymerization, with the 4) prepolymer/solid phase polymerization and 5) single-stage solid phase polymerization being more preferred.

In the method for producing the polyamide according to the present embodiment, the solid phase polymerization is preferably carried out in light of increasing the molecular weight of the polyamide, and the method in which the solid phase polymerization is carried out to increase the molecular weight of the polyamide is preferable to increase the molecular weight by the hot melt polymerization in respect of controlling the cyclic amino end content of the polyamide to a predetermined content.

In the production steps of the polyamide according to the present embodiment, it is preferable to add additives during the polymerization when the polymerization is carried out.

Examples of the additive used during the polymerization may include the (b) diamine, which is a raw material of the polyamide. The (b) diamine, for this use, refers to a (b) diamine to be further added, separate from the (b) diamine used for producing an equimolar amount of dicarboxylic acid and diamine salt, and the amount of this (b) diamine added as the additive is preferably 0.1 to 10 mol %, more preferably 0.5 to 5.0 mol %, further preferably 1.5 to 4.5 mol %, and still further preferably 2.6 to 4.0 mol %.

Adding an amount of the (b) diamine within the above range is an effective method for controlling the cyclic amino end content and also the amino end content to an intended value.

For the additives added during the polymerization of the polyamide according to the present embodiment, an organic acid such as formic acid or acetic acid may be added.

The addition of formic acid, or the like, likely causes the cyclic amino end content of the polymer ends to reduce, and is hence an effective method for controlling the cyclic amino end content to an intended value.

In the method for producing the polyamide according to the present embodiment, the polymerization mode may be either a batch method or a continuous method.

For reactors used for the methods other than the solid phase polymerization, examples thereof may include an autoclave type reactor, a tumbler type reactor, and an extruder type reactor such as a kneader, and various polymerization reactions can be carried out using these reactors.

The solid phase polymerization as the method for producing the polyamide according to the present embodiment may be carried out by using, for example, a tumbler type reactor, a vibration dryer type reactor, a Nauta mixer type reactor, or a stirring type reactor.

Specifically, the above reactor is charged with pellets, flakes, or a powder of the polyamide to polymerize the polyamide. Then, the molecular weight of the polyamide can be improved by heating at a temperature less than the melting point of the polyamide under a flow of an inert gas, such as nitrogen, argon and helium, or under a reduced pressure, or alternatively while feeding an inert gas from a lower portion of the reactor while extracting the internal gases under reduced pressure from an upper portion of the reactor.

The reaction temperature of the solid phase polymerization is preferably 100 to 350° C., more preferably 120 to 300° C., and further preferably 150 to 270° C.

After the polymerization, heating is stopped and the polyamide can be obtained by removing out of the reactor when the reaction temperature is reduced to preferably 0 to 100° C., and more preferably room temperature to 60° C.

In the method for producing the polyamide according to the present embodiment, it is preferable to polymerize a dicarboxylic acid and a diamine (including a lactam and/or an aminocarboxylic acid as necessary) at a reaction temperature less than the melting point of the polyamide in any of the above-mentioned "prepolymer/solid phase polymerization", "single-stage solid phase polymerization" and "solution method". However, the preparation step of the prepolymer may be carried out at a reaction temperature more than the melting point of the polyamide, followed by rapidly cooling to obtain the prepolymer.

Additionally, in the polymerization steps, the maximum ultimate pressure is preferably 10 kg/cm$^2$ or more, and more preferably 12 kg/cm$^2$ or more. Thus, the escape of the diamine can be suppressed, enabling the intended polyamide to have a higher molecular weight.

Further, it is preferable that the final temperature of the polymerization be less than the melting point of the polyamide. Thus, the effect of suppressing the production of cyclic amine compound is achieved.

By performing the production method of the above "prepolymer/solid phase polymerization" and "single-stage solid phase polymerization", the polyamide, while easily controlling the content of cyclic amino end, can have a higher molecular weight, good heat resistance, stability under heating, heat resistant color tone stability, reflow heat resistance properties and fogging properties, with a high melting point.

(Addition of End Capping Agent)

In the production step of the polyamide according to the present embodiment, when the polymerization is carried out by using the above (a) dicarboxylic acid and (b) diamine, and the (c) lactam and/or aminocarboxylic acid as necessary, the known end capping agent described earlier may further be added to adjust the molecular weight.

As described earlier, the polyamide according to the present embodiment has the cyclic amino end content of less than 30µ equivalents/g.

The cyclic amino end is formed by (1) the dehydration reaction between a cyclic amine compound having a piperidine ring and a carboxyl end, or (2) the deammonia reaction of the amino end of the polymer ends in a polymer molecule.

The cyclic amino end (1) formed by the dehydration reaction between a cyclic amine compound having a piperidine ring and a carboxyl end may also be produced by adding to the polymerization reaction system the (1a) cyclic amine compound having a piperidine ring as an end capping agent, and may also be produced by the deammonia reaction of the (1b) diamine having a pentamethylenediamine skeleton in a monomer molecule, in other words, the cyclic amino end (1) may also be formed when the diamine having a pentamethylenediamine skeleton contained in the (b) diamine reacting to the (a) dicarboxylic acid in the polymerization step undergoes the deammonia reaction in a monomer molecule and forms a cyclic amine compound.

The cyclic amino end of the polyamide according to the present embodiment is preferably an end derived from the cyclization reaction of the diamine contained in the (b) diamine at least 50 mol % and having the pentamethylenediamine skeleton.

More specifically, it is preferable that the cyclic amino end be obtained by the dehydration reaction between a carboxyl group and the cyclic amine compound produced in the polymerization reaction system when the (1b) diamine having a pentamethylenediamine skeleton undergoes the deammonia reaction in a monomer molecule, or (2) the deammonia reaction of the amino end of the polymer end in a polymer molecule.

Adding a cyclic amine compound having a piperidine ring as an end capping agent at the initial stage of the polymerization by the above method (1a) in order to form the polyamide and the cyclic amino end according to the present embodiment caps the end of a low molecular weight carboxyl at the initial stage of the polymerization and thus slows down the polymerization reaction speed of the polyamide, consequently making it difficult to obtain a high molecular weight product, whereas the cyclic amine having a piperidine ring produced during the reaction by the method of (1b) caps the end at the late stage of the polymerization when a molecular weight has been increased to a certain extent, making it easy to obtain a high molecular weight product of a polyamide, hence preferable.

Examples of the effective method for adjusting the cyclic amino end content to a certain amount may include, in addition to the aforementioned methods in which the amount added is adjusted to a predetermined range using the (b) diamine as an additive during the polymerization and the method in which a formic acid or acetic acid is added, a method in which the polymerization temperature and reaction time are adjusted and an addition amount, and the like, of the diamine that produces a cyclic amine, i.e., the diamine having a pentamethylenediamine skeleton, is also suitably adjusted.

The cyclic amine compound having a piperidine ring which produces a cyclic amino end in the polyamide according to the present embodiment may be produced as a by-product during the polymerization reaction of the polyamide.

For producing the cyclic amine compound having a piperidine ring, the higher the reaction temperature is, the faster the reaction is facilitated.

Specifically, when 2-methylpentamethylenediamine is used as the raw material diamine having a pentamethylenediamine skeleton, it is preferable to polymerize the (a) dicarboxylic acid and (b) diamine (including the (c) lactam and/or aminocarboxylic acid as necessary) at a reaction temperature less than the melting point of the polyamide. The reaction temperature is more preferably a temperature lower than 60° C. or more than the melting point, further preferably a temperature lower than 80° C. or more than the melting point, and particularly preferably a temperature lower than 100° C. or more than the melting point, of the polyamide.

Since the production of the cyclic amine compound having a piperidine ring can be suppressed by allowing the polymerization to proceed at a reaction temperature less than the melting point of the polyamide, it is effective as the method for adjusting the cyclic amino end content less than 30μ equivalents/g.

As described above, it is preferable for the polyamide of the present embodiment that, in the polymer end, the total end group content (hereinafter referred to as "total molecular chain end group content") and the content of amino groups at such an end (hereinafter referred to as "amino end content") satisfy predetermined conditions.

More specifically, it is preferable that the ratio of {total molecular chain end group content−amino end content} (μmol/g) to the total molecular chain end group content (μmmol/g) satisfy the following expression (1).

$$0.70<\{\text{total molecular chain end group content−amino end content}\}/\text{total molecular chain end group content}<1.0 \quad (1)$$

To satisfy the above expression (1), the ratio of amino end groups in the total molecular chain end group content must be controlled. Examples of the effective method may include a method in which the amounts of the diamine and the end capping agent added as additives during the hot melt polymerization of the polyamide as well as the polymerization conditions are controlled.

[Properties of the Polyamide]
(Molecular Weight)

It is preferable that the molecular weight of the polyamide according to the present embodiment, using the sulfuric acid relative viscosity ηr at 25° C. as the indicator, have a sulfuric acid relative viscosity ηr at 25° C. of 2.3 or more. It is more preferably 2.3 to 7.0, further preferably 2.5 to 5.5, and particularly preferably 2.8 to 4.0.

Example of the effective method for controlling the sulfuric acid relative viscosity ηr at 25° C. of the polyamide may include a method in which the amounts of the diamine and the end capping agent added as additives during the hot melt polymerization of the polyamide as well as the polymerization conditions are controlled.

When a sulfuric acid relative viscosity ηr at 25° C. is 2.3 or more, the polyamide has good mechanical properties such as toughness and strength. In light of the molten fluidity, when the sulfuric acid relative viscosity ηr at 25° C. of the polyamide is 7.0 or less, the polyamide can have good fluidity.

Measurement of the sulfuric acid relative viscosity at 25° C., as described in Examples below, can be carried out in 98% sulfuric acid at 25° C. in accordance with JIS-K6920.

Alternatively, the formic acid relative viscosity VR at 25° C. can also be used as the indicator for the molecular weight of the polyamide. Measurement of the formic acid relative viscosity VR, as described in Examples below, can be carried out in 90% formic acid at 25° C. in accordance with JIS-K6920.

(Melting Point)

The melting point of the polyamide according to the present embodiment, represented by Tm2, is preferably 280 to 350° C. in light of heat resistance.

The melting point of the polyamide can be controlled by the composition of the polyamide.

The melting point Tm2 is preferably 290° C. or more, more preferably 305° C. or more, and further preferably 315° C. or more. Also, the melting point Tm2 is preferably 350° C. or less, more preferably 340° C. or less, further preferably 335° C. or less, and still further preferably 330° C. or less.

When the melting point Tm2 of the polyamide is 280° C. or more, the polyamide can have good heat resistance. When the melting point Tm2 of the polyamide is 350° C. or less, the thermal decomposition, and the like, of the polyamide during the melt process such as extrusion or molding can be suppressed.

The heat of fusion ΔH of the polyamide is, in light of the heat resistance, preferably 10 to 100 J/g, more preferably 14 to 100 J/g, and further preferably 20 to 100 J/g.

Measurement of the melting point (Tm1 or Tm2) and the heat of fusion ΔH of the polyamide can be carried out in accordance with JIS-K7121 as described in Examples below.

Examples of the measurement apparatus for the melting point and heat of fusion may include Diamond-DSC, manufactured by PerkinElmer Inc.

(Color Tone)

The polyamide of the present embodiment has a color tone of, in terms of b value, preferably 10 or less, more preferably 8 or less, and further preferably 6 or less.

The b value can be measured by the method described in Examples below.

When the b value is 10 or less, a polyamide composition having good resistance to heat discoloration can be obtained.

[Polyamide Composition]

The polyamide composition of the present embodiment comprises the above polyamide and an inorganic filler.

When the polyamide composition comprises an inorganic filler, good heat resistance, stability under heating, heat resistant color tone stability, reflow heat resistance properties and fogging properties are attained while the properties of the polyamide having a high melting point are not affected, and, as the polyamide composition, further better strength and fabricability are particularly attained while satisfying the heat resistance, stability under heating, heat resistant color tone stability, reflow heat resistance properties and fogging properties.

(Inorganic Filler)

The inorganic filler composing the polyamide composition of the present embodiment is not particularly limited and a known material can be used.

Examples thereof may include a glass fiber, a carbon fiber, a calcium silicate fiber, a potassium titanate fiber, an aluminum borate fiber, glass flakes, talc, kaolin, mica, hydrotalcite, calcium carbonate, magnesium carbonate, zinc carbonate, zinc oxide, calcium phosphate monobasic, wollastonite, silica, zeolite, alumina, boehmite, aluminum hydroxide, titanium oxide, silicon oxide, magnesium oxide, calcium silicate, sodium aluminosilicate, magnesium silicate, Ketchen black, acetylene black, furnace black, carbon nanotubes, graphite, brass, copper, silver, aluminum, nickel, iron, calcium fluoride, clay, montmorillonite, expandable fluorine mica, silicon nitride, and an apatite.

The inorganic filler may be used singly, or two or more may be used in combination.

In light of strength, rigidity and the like, it is preferred that the inorganic filler be a glass fiber, a carbon fiber, a potassium titanate fiber, an aluminum borate fiber, glass flakes, talc, kaolin, mica, silicon nitride, calcium carbonate, magnesium carbonate, calcium phosphate monobasic, wollastonite, silica, carbon nanotubes, graphite, calcium fluoride, clay, montmorillonite, expandable fluorine mica, and an apatite; and it is more preferred that the inorganic filler be at least one selected from the group consisting of a glass fiber, a potassium titanate fiber, an aluminum borate fiber, talc, kaolin, mica, silicon nitride, calcium carbonate, magnesium carbonate, wollastonite and clay.

Of the above inorganic fillers, the glass fibers and carbon fibers may have a cross-section that is a true circle or flattened.

Examples of the flattened cross-section may include rectangular, an oval shape close to rectangular, an oval shape, and a pod shape having a constricted middle section in the longitudinal direction.

Of the glass fibers and carbon fibers, it is preferable to use those having, in the polyamide composition, a number average fiber diameter of 3 to 30 µm, a weight average fiber length of 100 to 750 µm, and an aspect ratio (L/D) of weight average fiber length (L) to number average fiber diameter (D) of 10 to 100, in light of imparting the polyamide composition with good mechanical properties.

The number average fiber diameter of the inorganic filler in the polyamide composition may be determined by, for example, placing the polyamide composition in an electric furnace, combusting the organic matter contained in the polyamide composition, and from the resultant residue, for example, arbitrarily selecting 100 or more glass fibers, observing the selected fibers under SEM, and measuring the fiber diameters.

The weight average fiber length of the inorganic filler in the polyamide composition may be determined by arbitrarily selecting glass fibers in a similar manner, and measuring the fiber lengths using an SEM photograph at 1,000 times magnification.

The above inorganic filler is more preferably a reinforced fiber having a weight average fiber length of 1 to 15 mm. The weight average fiber length of such a reinforced fiber is 1 to 15 mm, and preferably 3 to 12 mm, in light of improving mechanical strength, rigidity and moldability.

The weigh average fiber length of the reinforced fiber can be determined by combusting or dissolving only the polyamide in the polyamide composition for removal, observing using an optical microscope, measuring the lengths of 400 reinforced fibers arbitrarily selected using an image analysis equipment, and calculating the average value.

When the length of each of the reinforced fibers is respectively expressed by L1, L2, . . . , L400, the calculation expression for a single weight average fiber length is represented by the following expression. In the following expression, the "i" is an integer of 1 to 400.

$$\text{Weight average fiber length} = \Sigma(Li^2)/\Sigma Li$$

The weight average fiber length is a value applied to the reinforced fiber while contained in the polyamide composition of the present embodiment.

More specifically, the weight average fiber length of the reinforced fiber at the stage before added to the polyamide is not limited to the above.

The material for reinforced fiber is not particularly limited as long as it is a reinforced fiber typically used in a polyamide.

Examples thereof may include inorganic fibers such as glass fibers, carbon fibers, boron fibers, and metal fibers (e.g.; stainless fibers, aluminum fibers, and copper fibers); fully aromatic polyamide fibers such as polyparaphenyleneterephthalamide fiber, polymetaphenyleneterephthalamide fiber, polyparaphenyleneisophthalamide fiber, polymetaphenyleneisophthalamide fiber, and fibers obtained from condensates of diaminodiphenyl ether and terephthalic acid or isophthalic acid; and organic fibers such as fully aromatic liquid crystal polyester fibers.

The reinforced fiber may be used singly, or two or more may be used in combination. Of these, in light of improving mechanical strength and rigidity, it is preferred to use at least one selected from glass fibers, carbon fibers, boron fibers and metal fibers, with glass fibers and/or carbon fibers being more preferred.

The above reinforced fiber is not limited in the average fiber diameter of monofilament, and, for example, those having a diameter of 5 to 25 µm are generally used.

The average fiber diameter of monofilaments can be determined by observing the reinforced fiber to be used using an optical microscope and calculating the average value when the diameters of 400 fibers arbitrarily selected using an image analysis equipment are measured.

Additionally, for the reinforced fiber, it is preferable to use a roving, which is a continuous fiber of sized monofilaments.

<Surface Treating Agent>

The inorganic fillers such as a glass fiber and a carbon fiber may be surface treated using a silane coupling agent, or the like.

The silane coupling agent is not particularly limited and examples thereof may include aminosilanes such as γ-aminopropyltriethoxysilane, γ-aminopropyltrimethoxysilane, and N-β-(aminoethyl)-γ-aminopropylmethyldimethoxysilane; mercaptosilanes such as γ-mercaptopropyltrimethoxysilane and γ-mercaptopropyltriethoxysilane; epoxy silanes; vinyl silanes. Of these, amino silanes are preferable.

The silane coupling agent may be used singly, or two or more may be used in combination.

<Sizing Agent>

The fibrous inorganic filler such as a glass fiber or carbon fiber may further contain, as a sizing agent, a copolymer comprising as constituent units an unsaturated vinyl monomer containing carboxylic acid anhydride and a unsaturated vinyl monomer, an epoxy compound, a polyurethane resin, an acrylic acid homopolymer, a copolymer of acrylic acid and another copolymerizable monomer, and a salt with a primary, secondary, or tertiary amine thereof.

Of these, in light of the mechanical properties (strength, in particular) of the polyimide composition, preferred are a copolymer comprising as constituent units a unsaturated vinyl monomer containing carboxylic acid anhydride and a unsaturated vinyl monomer (also written as a copolymer comprising as constituent units a unsaturated vinyl monomer containing carboxylic acid anhydride and a unsaturated vinyl monomer excluding the above unsaturated vinyl monomer containing carboxylic acid anhydride), an epoxy compound and a polyurethane resin, and more preferred are a copolymer comprising as constituent units a unsaturated vinyl monomer containing carboxylic acid anhydride and a unsaturated vinyl monomer, and a polyurethane resin.

The unsaturated vinyl monomer in the copolymer comprising as constituent units an unsaturated vinyl monomer containing carboxylic acid anhydride and a unsaturated vinyl monomer does not comprise a unsaturated vinyl monomer containing carboxylic acid anhydride.

The sizing agent may be used singly, or two or more may be used in combination.

The unsaturated vinyl monomer containing carboxylic acid anhydride composing the copolymer comprising as constituent units a unsaturated vinyl monomer containing carboxylic acid anhydride and a unsaturated vinyl monomer is not particularly limited, and examples thereof may include maleic anhydride, itaconic anhydride, and citraconic anhydride, with maleic anhydride being preferable.

The unsaturated vinyl monomer composing the copolymer comprising as constituent units a unsaturated vinyl monomer containing carboxylic acid anhydride and a unsaturated vinyl monomer is not particularly limited, and examples thereof may include styrene, α-methyl styrene, ethylene, propylene, butadiene, isoprene, chloroprene, 2,3-dichlorobutadiene, 1,3-pentadiene, cyclooctadiene, methyl methacrylate, methyl acrylate, ethyl acrylate, and ethyl methacrylate, with styrene and butadiene being preferable.

The copolymer comprising as constituent units a unsaturated vinyl monomer containing carboxylic acid anhydride and a unsaturated vinyl monomer is preferably, for example, a copolymer of maleic anhydride and butadiene, a copolymer of maleic anhydride and ethylene, and a copolymer of maleic anhydride and styrene.

The copolymer comprising as constituent units a unsaturated vinyl monomer containing carboxylic acid anhydride and a unsaturated vinyl monomer has a weight average molecular weight of preferably 2,000 or more, and in light of improving the fluidity of the polyamide composition, more preferably 2,000 to 1,000,000, and further preferably 2,000 to 1,000,000.

The weight average molecular weight can be measured by gel permeation chromatography (GPC).

The above epoxy compound is not particularly limited, and examples thereof may include aliphatic epoxy compounds such as ethylene oxide, propylene oxide, butene oxide, pentene oxide, hexene oxide, heptene oxide, octene oxide, nonene oxide, decene oxide, undecene oxide, dodecene oxide, pentadecene oxide, and eicosene oxide; alicyclic epoxy compounds such as glycidol, epoxy pentanol, 1-chloro-3,4-epoxybutane, 1-chloro-2-methyl-3,4-epoxybutane, 1,4-dichloro-2,3-epoxybutane, cyclopentene oxide, cyclohexene oxide, cycloheptene oxide, cyclooctene oxide, methyl cyclohexene oxide, vinylcyclohexene oxide, and epoxidized cyclohexene methyl alcohol; terpene epoxy compounds such as pinene oxide; aromatic epoxy compounds such as styrene oxide, p-chlorostyrene oxide, and m-chlorostyrene oxide; epoxidized soybean oil; and epoxidized linseed oil.

The polyurethane resin is not particularly limited, and those commonly used as a sizing agent may be used. Examples of preferably used resin may include those synthesized from an isocyanate, such as m-xylylene diisocyanate (XDI), 4,4'-methylenebis(cyclohexylisocyanate) (HMDI) and isophorone diisocyanate (IPDI), and a polyester or polyether diol.

The acrylic acid homopolymer (polyacrylic acid) has a weight average molecular weight of preferably 1,000 to 90,000, and more preferably 1,000 to 25,000.

The polyacrylic acid may be in the form of a salt with a primary, secondary, or tertiary amine.

The amine is not particularly limited, and examples thereof may include triethylamine, triethanolamine, and glycine.

The degree of neutralization of the polyacrylic acid in the form of a salt means the ratio of the acrylic acid component forming the salt among the acrylic acid components in the polyacrylic acid, and, in light of improving the stability of the mixed solution with another agent (silane coupling agent, or the like) used in combination and reducing the amine smell, the degree of neutralization is preferably 20 to 90%, and more preferably 40 to 60%.

The weight average molecular weight of the polyacrylic acid in the salt form is preferably 3,000 to 50,000, and, in light of improving the sizing properties of a glass fiber and carbon fiber, it is preferably 3,000 or more, and, in light of improving the mechanical properties of the polyamide composition, it is preferably 50,000 or less.

The other copolymerizable monomers in the copolymer of an acrylic acid and other copolymerizable monomers are not particularly limited, and examples thereof may include acrylic acid, maleic acid, methacrylic acid, vinyl acetic acid, crotonic acid, isocrotonic acid, fumaric acid, itaconic acid, citraconic acid, and mesaconic acid, which are monomers having a hydroxyl group and/or a carboxyl group. For the other copolymerizable monomers, it is preferable to use a monomer that is an ester of a monomer having a hydroxyl group and/or a carboxyl group.

The above copolymer of an acrylic acid and other copolymerizable monomers has a weight average molecular weight of preferably 1,000 to 90,000, and more preferably 1,000 to 25,000.

The copolymer of the acrylic acid and other copolymerizable monomers may be in the form of a salt with a primary, secondary, or tertiary amine.

The amine is not particularly limited, and examples thereof may include triethylamine, triethanolamine, and glycine.

The degree of neutralization of the copolymer in the form of a salt means the ratio of the acid component forming the salt among the acid components in the copolymer, and, in light of improving the stability of the mixed solution with another agent (silane coupling agent, or the like) used in combination and reducing the amine smell, the degree of neutralization is preferably 20 to 90%, and more preferably 40 to 60%.

The weight average molecular weight of the copolymer in the salt form is preferably 3,000 to 50,000, and, in light of improving the sizing properties of glass fiber and carbon fiber, it is preferably 3,000 or more, and, in light of improving the mechanical properties of the polyamide composition, it is preferably 50,000 or less.

The fibrous inorganic filler such as a glass fiber or carbon fiber containing the above sizing agent can be obtained by, during a known step for producing a glass fiber or carbon fiber, continuously reacting by drying a fibrous strand produced by feeding the sizing agent to the fibrous inorganic filler such as a glass fiber or carbon fiber using a known method such as a roller applicator.

The fibrous strand may be used as roving without further treatment, or may be further subjected to a cutting step and used as chopped glass strands.

It is preferred to feed (add) an amount of the sizing agent equivalent to 0.2 to 3% by mass on a solid content basis based on 100% by mass of the fibrous inorganic filler such as a glass fiber or carbon fiber, and it is more preferred to feed (add) 0.3 to 2% by mass.

In light of maintaining the size of the fibrous inorganic filler such as a glass fiber or carbon fiber, it is preferable that the amount of the sizing agent added be 0.2% by mass or more on a solid content basis based on 100% by mass of the fibrous inorganic filler such as a glass fiber or carbon fiber. In light of improving the thermal stability of the polyamide composition, it is preferable that the amount of the sizing agent added be 3% by mass or less on a solid content basis. The strands may be dried after the cutting step, or the strands may be cut after dried.

When a wollastonite is used as the inorganic filler composing the polyamide composition of the present embodiment, preferably used are those having a number average fiber diameter of 3 to 30 μm, a weight average fiber length of 10 to 500 μm and an aspect ratio (L/D) of 3 to 100 in the polyamide composition.

When talc, mica, kaolin, silicon nitride or the like is used as the inorganic filler, those having a number average fiber diameter of 0.1 to 3 μm in the polyamide composition are preferable.

(Other Additives)

The polyamide composition of the present embodiment may also comprise the additives commonly used in polyamides within the range in which the object of the present embodiment is not affected. Examples of the additive contained may include a coloring agent (including a coloring master batch) such as a pigment and a dye, a fire retardant, a fibrillation agent, a lubricant, a fluorescent bleaching agent, a plasticizing agent, an antioxidant, a light stabilizer, an ultraviolet absorber, an antistatic agent, a flow improver, a filler, a reinforcing agent, a spreading agent, a nucleating agent, rubber, a strengthening agent as well as other polymers.

Further, the polyamide composition may comprise as the heat stabilizer at least one selected from the group consisting of phenolic stabilizers, phosphorus stabilizers, amine stabilizers, metal salts of elements in Group Ib, Group IIb, Group IIIa, Group IIIb, Group IVa, and Group IVb in the periodic table, and halides of an alkali metal and an alkali earth metal.

The phenolic stabilizer is not particularly limited, and examples thereof may include hindered phenol compounds.

The phenolic stabilizer has the property of imparting heat resistance and light resistance to a resin such as a polyamide and a fiber.

The hindered phenol compounds is not particularly limited, and examples thereof may include N,N'-hexane-1,6-diylbis[3-(3,5-di-t-butyl-4-hydroxyphenylpropionamide), pentaerythrityl-tetrakis[3-(3,5-di-t-butyl-4-hydroxyphenyl) propionate], N,N'-hexamethylenebis(3,5-di-t-butyl-4-hydroxy-hydrocinnamamide), triethyleneglycol-bis[3-(3-t-butyl-5-methyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxapiro[5,5]undecane, 3,5-di-t-butyl-4-hydroxybenzylphosphonate-diethyl ester, 1,3,5-trimethyl-2,4,6-tris(3,5-di-t-butyl-4-hydroxybenzyl) benzene, and 1,3,5-tris(4-t-butyl-3-hydroxy-2,6-dimethylbenzyl)isocyanurate. Of these, in light of improving thermal aging resistance, N,N'-hexane-1,6-diylbis[3-(3,5-di-t-butyl-4-hydroxyphenylpropionamide) is preferable.

The phenolic stabilizer may be used singly, or two or more may be used in combination.

When a phenolic stabilizer is used, an amount of the phenolic stabilizer added in the polyamide composition is, based on 100 parts by mass of the polyamide composition, preferably 0.01 to 1 part by mass, and more preferably 0.1 to 1 part by mass. The amount added within the above range can further improve thermal aging resistance and reduce the amount of produced gases.

The phosphorus stabilizer is not particularly limited, and examples thereof may include pentaerythritol phosphite compound, trioctyl phosphite, trilauryl phosphite, tridecyl phosphite, octyldiphenyl phosphite, trisisodecyl phosphite, phenyl diisodecyl phosphite, phenyl di(tridecyl)phosphite, diphenyl isooctyl phosphite, diphenyl isodecyl phosphite, diphenyl(tridecyl)phosphite, triphenyl phosphite, tris(nonylphenyl)phosphite, tris(2,4-di-t-butylphenyl)phosphite, tris (2,4-di-t-butyl-5-methylphenyl)phosphite, tris(butoxyethyl) phosphite, 4,4'-butylidene-bis(3-methyl-6-t-butylphenyl-tetra-tridecyl)diphosphite, tetra(C12 to C15 mixed alkyl)-4,4'-isopropylidenediphenyl diphosphite, 4,4'-isopropylidenebis(2-t-butylphenyl)-di(nonylphenyl) phosphite, tris(biphenyl)phosphite, tetra(tridecyl)-1,1,3-tris (2-methyl-5-t-butyl-4-hydroxyphenyl)butane diphosphite, tetra(tridecyl)-4,4'-butylidenebis(3-methyl-6-t-butylphenyl) diphosphite, tetra(C1 to C15 mixed alkyl)-4,4'-isopropylidenediphenyl diphosphite, tris(mono-, di-mixed nonylphenyl)phosphite, 4,4'-isopropylidenebis(2-t-butylphenyl)-di (nonylphenyl)phosphite, 9,10-di-hydro-9-oxa-9-oxa-10-phosphaphenanthrene-10-oxide, tris(3,5-di-t-butyl-4-hydroxyphenyl)phosphite, hydrogenated-4,4'-isopropylidenediphenyl polyphosphite, bis(octylphenyl)-bis (4,4'-butylidenebis(3-methyl-6-t-butylphenyl))-1,6-hexanol diphosphite, hexamidecyl-1,1,3-tris(2-methyl-4-hydroxy-5-t-butylphenyl)diphosphite, tris(4,4'-isopropylidenebis(2-t-butylphenyl))phosphite, tris(1,3-stearoyloxyisopropyl)phosphite, 2,2-methylenebis(4,6-di-t-butylphenyl)octyl phosphite, 2,2-methylenebis(3-methyl-4,6-di-t-butylphenyl)-2-ethylhexyl phosphite, tetrakis(2,4-di-t-butyl-5-methylphenyl)-4,4'-biphenylene diphosphite, and tetrakis(2,4-di-t-butylphenyl)-4,4'-biphenylene diphosphite. Of these, in light of further improving thermal aging resistance and reducing the amount of produced gases, pentaerythritol phosphite compound and tris(2,4-di-t-butylphenyl)phosphite are preferable.

The pentaerythritol phosphite compound is not particularly limited, and examples thereof may include 2,6-di-t-butyl-4-methylphenyl-phenyl-pentaerythritol diphosphite, 2,6-di-t-butyl-4-methylphenyl-methyl-pentaerythritol diphosphite, 2,6-di-t-butyl-4-methylphenyl-2-ethylhexyl-pentaerythritol diphosphite, 2,6-di-t-butyl-4-methylphenyl-isodecyl-pentaerythritol diphosphite, 2,6-di-t-butyl-4-methylphenyl-lauryl-pentaerythritol diphosphite, 2,6-di-t-butyl-4-methylphenyl-isotridecyl-pentaerythritol diphosphite, 2,6-di-t-butyl-4-methylphenyl-stearyl-pentaerythritol diphosphite, 2,6-di-t-butyl-4-methylphenyl-cyclohexyl-pentaerythritol diphosphite, 2,6-di-t-butyl-4-methylphenyl-benzyl-pentaerythritol diphosphite, 2,6-di-t-butyl-4-methylphenyl-ethylcellosolve-pentaerythritol diphosphite, 2,6-di-t-butyl-4-methylphenyl-butylcarbitol-pentaerythritol diphosphite, 2,6-di-t-butyl-4-methylphenyl-octylphenyl-pentaerythritol diphosphite, 2,6-di-t-butyl-4-methylphenyl-nonylphenyl-pentaerythritol diphosphite, bis(2,6-di-t-butyl-4-methylphenyl)pentaerythritol diphosphite, bis(2,6-di-t-butyl-4-ethylphenyl)pentaerythritol diphosphite, 2,6-di-t-butyl-4-methylphenyl-2,6-di-t-butylphenyl-pentaerythritol diphosphite, 2,6-di-t-butyl-4-methylphenyl-2,4-di-t-butylphenyl-pentaerythritol diphosphite, 2,6-di-t-butyl-4-methylphenyl-2,4-di-t-octylphenyl-pentaerythritol diphosphite, 2,6-di-t-butyl-4-methylphenyl-2-cyclohexylphenyl-pentaerythritol diphosphite, 2,6-di-t-amyl-4-methylphenyl-phenyl-pentaerythritol diphosphite, bis(2,6-di-t-amyl-4-methylphenyl)pentaerythritol diphosphite, and bis(2,6-di-t-octyl-4-methylphenyl)pentaerythritol diphosphite. Of these, bis(2,6-di-t-butyl-4-methylphenyl)pentaerythritol diphosphite, bis (2,6-di-t-butyl-4-ethylphenyl)pentaerythritol diphosphite, bis(2,6-di-t-amyl-4-methylphenyl)pentaerythritol diphosphite, and bis(2,6-di-t-octyl-4-methylphenyl)pentaerythritol diphosphite are preferred, with bis(2,6-di-t-butyl-4-methylphenyl)pentaerythritol diphosphite being more preferred.

The phosphorus stabilizer may be used singly, or two or more may be used in combination.

When a phosphorus stabilizer is used, an amount of the phosphorus stabilizer added in the polyamide composition is, based on 100 parts by mass of the polyamide composition, 0.01 to 1 part by mass, and more preferably 0.1 to 1 part by mass. The amount added within the above range can further improve thermal aging resistance and reduce the amount of produced gases.

The amine stabilizer is not particularly limited, and examples thereof may include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl)-tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetramethylpiperidine, and a condensate of 1,2,3,4-butanetetracarboxylic acid, 1,2,2,6,6-pentamethyl-4-piperidinol, and β,β,β',β'-tetramethyl-3,9-[2,4,8,10-tetraoxaspiro(5,5)undecane]diethanol.

The amine stabilizer may be used singly, or two or more may be used in combination.

When an amine stabilizer is used, an amount of the amine stabilizer added in the polyamide composition is, based on 100 parts by mass of the polyamide composition, preferably 0.01 to 1 part by mass, and more preferably 0.1 to 1 part by mass. The amount added within the above range can further improve light resistance and thermal aging resistance and reduce the amount of produced gases.

The metal salt of an element in Group Ib, Group IIb, Group IIIa, Group IIIb, Group IVa, and Group IVb in the periodic table is not particularly limited and a copper salt is preferable as a heat stabilizer.

The copper salt is not particularly limited, and examples thereof may include halogenated coppers (copper iodide, copper (I) bromide, copper (II) bromide, copper (I) chloride, and the like), copper acetate, copper propionate, copper benzoate, copper adipate, copper terephthalate, copper isophthalate, copper salicylate, copper nicotinate, and copper stearate; and copper complexes in which copper is coordinated to a chelating agent such as ethylenediamine, or ethylenediaminetetraacetic acid. Of these, the copper salt is preferably at least one selected from the group consisting of copper iodide, copper(I) bromide, copper(II) bromide, copper(I) chloride and copper acetate, more preferably copper iodide and/or copper acetate. When the above metal salt, a copper salt in particular, is used, a polyamide composition can be obtained that has good thermal aging resistance and is capable of suppressing metal corrosion of the screw or the cylinder parts (hereinafter, simply referred to as "metal corrosion") during the extrusion.

The metal salt may be used singly, or two or more may be used in combination.

When a copper salt is used, an amount of the copper salt added in the polyamide composition is, based on 100 parts by mass of the polyamide composition, preferably 0.01 to 0.2 parts by mass, and more preferably 0.02 to 0.15 parts by mass. The amount added within the above range can further improve thermal aging resistance and suppress copper precipitation and metal corrosion.

Further, in light of improving thermal aging resistance, the content of the copper element is, based on the total amount of polyamide composition, preferably 10 to 500 ppm, more preferably 30 to 500 ppm, and further preferably 50 to 300 ppm.

The halide of the alkali metal and the alkali earth metal is not particularly limited, and examples thereof may include potassium iodide, potassium bromide, potassium chloride, sodium iodide and sodium chloride, and mixtures of these. Of these, in light of improving thermal aging resistance and suppressing metal corrosion, potassium iodide, potassium bromide and combinations thereof are preferred, with potassium iodide being more preferred.

The halide may be used singly, or two or more may be used in combination.

When the halide of the alkali metal and the alkali earth metal is used, an amount of the halide of the alkali metal and the alkali earth metal added in the polyamide composition is preferably 0.05 to 5 parts by mass, and more preferably 0.2 to 2 parts by mass, based on 100 parts by mass of the polyamide composition. The amount added within the above range can further improve thermal aging resistance and suppress copper precipitation and metal corrosion.

In the polyamide composition according to the present embodiment, a mixture of the copper salt and the halide of the alkali metal and the alkali earth metal can be preferably used as the heat stabilizer. It is preferable to contain the copper salt and the halide of the alkali metal and the alkali earth metal in the polyamide composition so that the molar ratio of halogen to copper (halogen/copper) is 2/1 to 40/1, more preferably 5/1 to 30/1.

The molar ratio (halogen/copper) within the above range can further improve the thermal aging resistance of the polyamide composition. When the molar ratio (halogen/copper) is 2/1 or more, the copper precipitation and metal corrosion can be suppressed, hence preferable. When the molar ratio (halogen/copper) is 40/1 or less, the corrosion of the molding machine screw, and the like, can be prevented substantially without deteriorating the mechanical properties such as toughness, hence preferable.

[Method for Producing the Polyamide Composition]

The method for producing the polyamide composition according to the present embodiment is not particularly limited as long as it is a method in which the polyamide and inorganic filler described above, and other additives as necessary, are mixed.

Examples of the method for mixing the constituent materials of the polyamide composition may include a method in which the constituent materials are mixed using a Henschel mixer, or the like, the mixture is fed to a melt kneader for kneading; and a method in which the inorganic filler and other additives are added from a side feeder to the polyamide made into a melt state using a single-screw or twin-screw extruder.

In the method for feeding the components composing the polyamide composition to a melt kneader, all the constituent components (polyamide, inorganic filler, and the like) may be fed all at once to the same supply opening, or the constituent components may be fed respectively from different supply openings.

The melt kneading temperature is preferably about 250 to 375° C. at a resin temperature.

The melt kneading time is preferably about 0.5 to 5 minutes.

The apparatus for performing the melt kneading is not particularly limited and known apparatuses, for example, melt kneaders such as a single-screw or twin-screw extruder, a Banbury mixer, or a mixing roll may be used.

An amount of the inorganic filler added is preferably 0.1 to 200 parts by mass, more preferably 1 to 180 parts by mass, and further preferably 5 to 150 parts by mass, based on 100 parts by mass of the polyamide.

The addition amount of 0.1 parts by mass or more improves mechanical properties such as toughness, strength, and rigidity of the polyamide composition, whereas the addition amount of 200 parts by mass or less can provide a polyamide composition with good moldability.

The method for producing the polyamide composition, when the inorganic filler contained in the polyamide composition is a reinforced fiber having a weight average fiber length of 1 to 15 mm, is not particularly limited, and examples thereof may include a protrusion method in which the polyamide is subjected to melt kneading using a twin-screw extruder, a reinforced fiber roving is impregnated with the molten polyamide to obtain polyamide-impregnated strands and a method in which impregnated strands are thoroughly impregnated with the polyamide by the step of twisting spirally.

The content of the reinforced fiber having a weight average fiber length of 1 to 15 mm in the polyamide composition of the present embodiment is, in light of strength, strength under heating, durability and moldability, preferably 20 to 80% by mass, more preferably 25 to 75% by mass, and further preferably 30 to 70% by mass.

[Properties of the Polyamide Composition]

It is preferable that the polyamide composition according to the present embodiment have a sulfuric acid relative viscosity $\eta r$ at 25° C. of 2.3 or more. It is more preferably 2.3 to 7.0, further preferably 2.5 to 5.5, and particularly preferably 2.8 to 4.0. When a sulfuric acid relative viscosity $\eta r$ at 25° C. is 2.3 or more, the polyamide composition has good mechanical properties such as toughness and strength. Further, in light of molten fluidity, the sulfuric acid relative viscosity $\eta r$ at 25° C. of the polyamide is preferably 7.0 or less.

Measurement of the sulfuric acid relative viscosity at 25° C., as described in Examples below, can be carried out in 98% sulfuric acid at 25° C. in accordance with JIS-K6920.

The melting point of the polyamide composition, Tm2, is preferably 280 to 350° C. in light of heat resistance. The melting point Tm2 is preferably 290° C. or more, more preferably 305° C. or more, and further preferably 315° C. or more. Also, the melting point Tm2 is preferably 350° C. or less, more preferably 340° C. or less, further preferably 335° C. or less, and still further preferably 330° C. or less. When the melting point Tm2 of the polyamide composition is 280° C. or more, the polyamide composition can have good heat resistance. When the melting point Tm2 is 350° C. or less, the thermal decomposition, and the like, during the melt process such as extrusion or molding can be suppressed.

The heat of fusion $\Delta H$ of the polyamide composition is, in light of heat resistance, preferably 5 to 80 J/g, more preferably 7 to 80 J/g, and further preferably 10 to 80 J/g.

Measurement of the melting point (Tm1 or Tm2) and the heat of fusion $\Delta H$ of the polyamide composition can be carried out in accordance with JIS-K7121 as described in Examples below.

Examples of the melting point and heat of fusion measurement apparatus may include Diamond-DSC, manufactured by PerkinElmer Inc.

When the measured value of each of the above properties of the polyamide composition is within the same range as the preferable range of the measured values of the polyamide properties, a polyamide composition with good heat resistance, moldability and chemical resistance can be obtained.

[Molded Products of the Polyamide and Polyamide Composition]

The polyamide and polyamide composition according to the present embodiment can be used to obtain various molded products using a known molding method, such as press molding, injection molding, gas-assisted injection molding, welding molding, extrusion molding, blow molding, film molding, hollow molding, multilayer molding, or melt spinning.

The molded products obtained using the polyamide and polyamide composition according to the present embodiment have good strength, heat resistance, stability under heating, heat resistant color tone stability, reflow heat resistance properties, fogging properties and fabricability.

Accordingly, the polyamide and polyamide composition according to the present embodiment can be used, for example, as a material for various parts, such as in automobile uses, electric and electronic parts, industrial materials, and daily and household products and can also be preferably used in extrusion applications.

The automobile uses are not particularly limited, and examples thereof may include an air intake system component, a cooling system component, a fuel system component, an interior component, an exterior component, and an electrical component.

The automobile air intake system component is not particularly limited, and examples thereof may include an air intake manifold, an intercooler inlet, an exhaust pipe cover, an inner bushing, a bearing retainer, an engine mount, an engine head cover, a resonator, and a throttle body.

The automobile cooling system component is not particularly limited, and examples thereof may include a chain cover, a thermostat housing, an outlet pipe, a radiator tank, an alternator, and a delivery pipe.

The automobile fuel system component is not particularly limited, and examples thereof may include a fuel delivery pipe and a gasoline tank case.

The interior component is not particularly limited, and examples thereof may include an instrument panel, a console box, a glove box, a steering wheel, and a trimming.

The external component is not particularly limited, and examples thereof may include a molding, a lamp housing, a front grill, a mud guard, a side bumper, a door mirror stay, and a roof rail.

The electrical component is not particularly limited, and examples thereof may include a connector, a wire harness connector, a motor component, a lamp socket, an on-board sensor switch, and a combination switch.

The electric and electronic uses are not particularly limited, and examples thereof may include a connector, a switch, a relay, a printed wiring board, an electronic component housing, an electric outlet, a noise filter, a coil bobbin, and a motor end cap.

The industrial material is not particularly limited, and examples thereof may include a gear, a cam, an insulation block, a valve, a power tool component, an agricultural machine component, and an engine cover.

The daily and household products are not particularly limited, and examples thereof may include a button, a food container, and office equipment.

The extrusion application is not particularly limited, and examples thereof may include a film, a sheet, a filament, a tube, a rod, and a hollow molded product.

EXAMPLES

The present embodiment will be more specifically described using the following Examples and Comparative Examples. However, the present embodiment is not limited to only these Examples.

Raw materials and measurement methods used in Examples and Comparative Examples are shown below.

In the present Examples, 1 Kg/cm$^2$ means 0.098 MPa.
[(A) Raw Materials of Polyamide]
<(a) Dicarboxylic Acid>
(1) 1,4-Cyclohexanedicarboxylic acid (CHDA), trade name 1,4-CHDA HP Grade (trans/cis (molar ratio)=25/75), manufactured by Eastman Chemical Company
(2) Terephthalic acid (TPA), trade name Terephthalic Acid, manufactured by Wako Pure Chemical Industries, Ltd.
(3) Adipic acid (ADA), trade name Adipic Acid, manufactured by Wako Pure Chemical Industries, Ltd.
(4) Dodecanedioic acid (C12DA), trade name Dodecanedioic Acid, manufactured by Wako Pure Chemical Industries, Ltd.
<(b) Diamine>
(5) 2-Methylpentamethylenediamine (2MPD), trade name 2-Methyl-1,5-diaminopentane, manufactured by Tokyo Chemical Industry Co., Ltd.
(6) Pentamethylenediamine (PMD), trade name 1,5-Diaminopentane, manufactured by Wako Pure Chemical Industries, Ltd.
(7) Hexamethylenediamine (HMD), trade name Hexamethylenediamine, manufactured by Wako Pure Chemical Industries, Ltd.
(8) 1,10-diaminodecane (decamethylenediamine) (C10DA), trade name: 1,10-Decaneamine (Kokura Synthetic Industries, Ltd.)
[(B) Inorganic Filler]
(9) Glass fiber (GF), trade name ECS03T275H, average fiber diameter (average particle size) 10 μm (circularity), cut length 3 mm, manufactured by Nippon Electric Glass Co., Ltd.
(10) Wollastonite, trade name NYAD 400, average fiber diameter (average particle size) 7 μm, average fiber length 35 μm, manufactured by NYCO
(11) Acetic acid, trade name Acetic Acid, manufactured by Wako Pure Chemical Industries, Ltd.
[Calculation of Polyamide Component Content]

The mol % of the (a-1) alicyclic dicarboxylic acid was determined by calculating the (number of moles of the (a-1) alicyclic dicarboxylic acid added as a raw material monomer/number of moles of all the (a) dicarboxylic acid added as a raw material monomer)×100.

The mol % of the (b-1) diamine having the pentamethylenediamine skeleton was determined by calculating the (number of moles of the (b-1) diamine having the pentamethylenediamine skeleton added as a raw material monomer/number of moles of all the (b) diamine added as a raw material monomer)×100.

When performing the calculation based on the above formula, the number of moles of the (b-1) diamine having the pentamethylenediamine skeleton added as an additive during melt polymerization was not comprised in the denominator and the numerator.

[Measuring Method of Properties]
<(1) Melting Points Tm1, Tm2 (° C.), and Heat of Fusion ΔH>

Melting points Tm1, Tm2 were measured using the Diamond-DSC, manufactured by PerkinElmer Inc., based on JIS-K7121. Measurement was carried out under conditions of a nitrogen atmosphere, by taking Tm1 (° C.) as the temperature at the endothermic peak (melting peak) which appeared on the highest temperature side when the temperature of a specimen of about 10 mg was increased to 300 to 350° C. depending on the melting point of the sample at a rate of temperature increase of 20° C./min; a melting point Tm2 (° C.) as the temperature at the endothermic peak (melting peak) which appeared on the highest temperature side when, after maintaining the temperature in a melt state at the maximum temperature for 2 minutes, lowering the temperature to 30° C. at a rate of temperature decrease of 20° C./min, maintaining the temperature at 30° C. for 2 minutes, and then similarly increasing the temperature at a rate of temperature increase of 20° C./min; and a total peak area as the heat of fusion ΔH (J/g).

In cases where there was a plurality of peaks as Tm2, peaks having a ΔH of 1 J/g or more were determined to be peaks. If there are two peaks as Tm2, for example, one at a melting point of 295° C., ΔH=20 J/g, and another one at a melting point of 325° C., ΔH=5 J/g, the melting point was taken to be a higher value (325° C.) and ΔH=25 J/g, the added value of all the peaks.

<(2) Sulfuric Acid Relative Viscosity ηr at 25° C.>

Measurement of the relative viscosity was carried out based on JIS-K6920. More specifically, using 98% sulfuric acid, a polymer solution (ratio of (polyamide 1 g)/(98% sulfuric acid 100 mL)) was prepared, and the relative viscosity was measured under temperature conditions of 25° C.

<(3) Cyclic Amino End Content (μ Equivalents/g)>

The cyclic amino end content in a solution in which 30 to 40 mg of polyamide was dissolved in 1.2 g of hexafluoro isopropanol deuteride was measured at room temperature under conditions of a frequency of 500 MHz and a scanning number of 1600, using 1H-NMR ("JNM ECA500", manufactured by JEOL Ltd.).

The cyclic amino end content was calculated using the integral ratio between the signal (chemical shift value 3.5 to 4.0 ppm) of the hydrogen bonded to the carbon adjacent to the nitrogen atom of a nitrogen heterocycle and the signal (chemical shift value 3.0 to 3.5 ppm) of the hydrogen bonded to the carbon adjacent to the nitrogen atom of the amide bond in the polyamide main chain.

The total molecular chain end group content which was used during this calculation was calculated as 2/Mn×1,000,000 using the number average molecular weight (Mn) measured by GPC (gel permeation chromatography, HLC-8020, hexafluoroisopropanol solvent, based on a PMMA (polymethylmethacrylate) standard sample (manufactured by Polymer Laboratories), manufactured by Tosoh Corporation).

<(4) Amino End Content (μ Equivalents/g)>

The amino end content was measured by neutralization titration.

3.0 g of polyamide was dissolved in 100 mL of an aqueous 90% phenol solution. Titration was carried out using 0.025 N hydrochloric acid to determine the amino end content. The endpoint was determined from the indicated value on a pH meter.

<(5) ηr Maintenance Ratio at Dwell>

A test piece was injection molded with a dwell time in a screw of 6 minutes (average value) by adjusting a cooling time when obtaining a multipurpose test piece (A type) from polyamide pellets.

The ηr of the 6-minute dwell time test piece was measured by the method described in the item (2), and the relative value (percentage) when the ηr of the polyamide pellets was 100 was taken as the ηr maintenance ratio at dwell.

<(6) Deflection Temperature Under Load (HDT) (° C.)>

A molded piece was obtained as an ISO 3167 multipurpose test piece (A type) from the polyamide pellets obtained in Examples and Comparative Examples using an injection molding machine (PS-40E, manufactured by Nissei Plastic Industrial Co., Ltd.). The injection molding conditions were set to injection+pressure dwell time of 25 seconds, a cooling time of 15 seconds, a die temperature of Tg+20° C., and a cylinder temperature of (Tm2+10)° C. to (Tm2+30)° C.

The dwell time in the screw was 2 minutes (average value).

A deflection temperature under load in a load of 0.46 MPa was measured using the obtained multipurpose test piece (A type) in accordance with ISO-75-2.

<(7) Heat Resistant Color Tone Stability>

The cooling time was adjusted when a multipurpose test piece (A type) was obtained from the polyamide pellets or polyamide composition pellets to produce test pieces in which the dwell times in the screw were different.

The test pieces in which the average dwell times were 2 minutes, 6 minutes, and 10 minutes were produced, and the test piece in which the dwell time was 2 minutes was taken as the standard sample. Change in the color of the test piece based on the dwell time was rated on the following standard.

⊚: change in color of the test piece was not observed in dwelling for 10 minutes.

◯: change in color of the test piece was observed in dwelling for 10 minutes.

X: change in color of the test piece was observed in dwelling for 6 minutes.

<(8) Heat Resistant Reflow Property>

A test piece (having a length of 127 mm, a width of 12.7 mm, and a thickness of 1.6 mm) was obtained from the polyamide pellets obtained in Examples and Comparative Examples using an injection molding machine ("IS-80EPN", manufactured by Toshiba Machine Co., Ltd.). The injection molding conditions were set to injection+pressure dwell time of 25 seconds, a cooling time of 15 seconds, a die temperature of Tg+20° C., and a cylinder temperature of (Tm2+10)° C. to (Tm2+30)° C.

The obtained multipurpose test piece was heated in a hot-air reflow furnace. Change in the shape of the test piece and degree of change in color were observed and rated based on the following standards.

⊚: No change in the shape of a test piece. Extremely slight change in the color of the test piece is observed.

◯: Change in the shape of a test piece. Extremely slight change in the color of the test piece is observed.

X: Change in the shape of a test piece. Apparent change in color of the test piece is observed.

The hot-air reflow furnace used for the test was a reflow furnace for lead-free soldering ("UNI-6116H", manufactured by Nippon Antom). With respect to temperature setting, the temperature of a preheat zone was set at 180° C., while the temperature of a soldering zone was set at 280° C.

The speed of a conveyor belt in the reflow furnace was set at 0.3 m/min. Under the above conditions, a temperature profile in the furnace was observed. An exposure time to heat of from 140° C. to 200° C. was 90 seconds, an exposure time to heat of 220° C. or more was 48 seconds, and an exposure time to heat of 260° C. or more was 11 seconds. The maximum ultimate temperature was 265° C.

<(9) Fogging Property>

Each end of the multipurpose test piece (A type) of polyamide obtained by the method of the item (6) was cut to produce rectangular parallelepiped molded pieces having a thickness of 4 mm, a width of 10 mm, and a length of 50 mm. Two of the resulting molded pieces were charged in a glass bottle having an outer diameter of 25 mm, a length of about 70 mm, and an internal volume of 50 cm$^3$. A glass plate was placed on the upper portion of the glass bottle as a lid.

The glass bottle comprising the molded pieces therein were placed in a hot-air oven set at 220° C., and allowed to stand for about 20 hours.

After cooling to room temperature, the glass plate was taken out and the evaluation was performed. The evaluation rating was as follows.

⊚: An adherent matter is not seen.

◯: An extremely slight adherent matter is observed.

X: x: An apparent adherent matter is observed.

<(10) Color Tone>

The b value of the polyamide pellets obtained in Examples and Comparative Examples was measured according to a reflection method using the Colorimeter ZE-2000, manufactured by Nippon Denshoku Industries Co., Ltd.

Specifically, the pellet sample was pressed out to a thickness of 13 mm using a purpose-built jig, and the color tone was measured by a method projecting light from a 10 mmφ opening.

<(11) Tensile Strength (MPa)>

A molded piece was obtained as an ISO 3167 multipurpose test piece (A type) from the polyamide composition pellets obtained in Examples and Comparative Examples using the injection molding machine (PS-40E, manufactured by Nissei Plastic Industrial Co., Ltd.). The injection molding conditions were set to injection+pressure dwell time of 25 seconds, a cooling time of 15 seconds, a die temperature of Tg+20° C., and a cylinder temperature of (Tm2+10)° C. to (Tm2+30)° C. The dwell time in the screw was 2 minutes (average value).

Using the obtained multipurpose test piece (A type), the tensile strength was measured by performing a tensile test based on ISO 527 at a tension rate of 5 mm/min.

Herein, the glass transition temperature Tg (° C.) was measured using the Diamond-DSC, manufactured by PerkinElmer Inc., based on JIS-K7121. Measurement was carried out under conditions of using liquid nitrogen to rapidly cool a molten sample obtained by melting a specimen with a hot stage (EP80, manufactured by Mettler Toledo) to solidify the sample for use as a measurement sample. Using 10 mg of this sample, the temperature was increased to a range of 30 to 350° C. under a condition of a rate of temperature increase of 20° C./min, and the glass transition temperature was measured.

<(12) Number of Foreign Particles Due to Die-Lip Buildup (Number/5 kg)>

5 kg of the polyamide pellets obtained in Examples and Comparative Examples was spread over a metal bat, and the number of foreign particles due to die-lip buildup was visually counted. This number served as an index of fabricability.

Example 1

A polyamide polymerization reaction was carried out by "prepolymer-solid phase polymerization method".

896 g (5.20 mol) of (a) CHDA and 604 g (5.20 mol) of (b) 2 MPD were dissolved in 1,500 g of distilled water to produce 50 mass % aqueous solution containing equimolar raw material monomers.

The obtained aqueous solution and 18 g of 2 MPD (0.16 mol) as the additives added during polymerization were charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen.

Heating was continued from a solution temperature of about 50° C. until the pressure in the autoclave tank was, in terms of gauge pressure (hereinafter, pressure in the tank is always expressed as gauge pressure), about 2.5 kg/cm$^2$.

While removing water from the system to maintain the pressure in the tank at about 2.5 kg/cm$^2$, heating was continued so that the concentration of the aqueous solution was concentrated to about 85%.

Removal of water was stopped, and then heating was continued until the pressure in the tank was about 10 kg/cm$^2$ (the maximum ultimate pressure was about 10 kg/cm$^2$). The solution temperature in that state was about 210° C. While the heater temperature was adjusted so that the solution temperature was 210° C., the pressure in the tank was lowered over 60 minutes from 10 kg/cm$^2$ to atmospheric pressure (gauge pressure of 0 kg/cm$^2$).

Further, heating was continued, to adjust the heater temperature so that the temperature in the autoclave was 220° C. While the generated water vapor was gradually extracted, the reaction was carried out for 3 hours.

The obtained polyamide was pulverized to the size of 2 mm or less, and dried under a nitrogen flow to adjust the moisture content to less than about 0.2 mass %, and the measurements of the items (1) to (10) were performed.

Table 2 shows the measurement results.

Example 2

Further, "solid phase polymerization" was carried out using the polyamide obtained in the above-described [Example 1].

10 kg of the polyamide pellets obtained by the prepolymer-solid phase polymerization method was charged into a conical ribbon vacuum dryer (trade name: Ribocone RM-10V, manufactured by Okawara Corporation), and the contents of the dryer were thoroughly purged with nitrogen.

Under a 1 L/minute nitrogen flow, the pellets were heated at 260° C. for 6 hours while stirring. Then, while continuing to flow with nitrogen, the temperature was decreased. When the temperature reached about 50° C., the pellets were removed as is from the dryer to obtain a polyamide.

The measurements of the items (1) to (10) on the obtained polyamide were performed.

Table 2 shows the measurement results.

Examples 3 to 6

As the (a) dicarboxylic acid, the (b) diamine, and the additives added during polymerization, the compounds and their amounts shown in Table 1 below were used. In Example 4, acetic acid was used as an end-capping agent.

The polymerization final temperature was set to that shown in Table 1 below.

Polyamide polymerization was carried out under the conditions of the prepolymer-solid phase polymerization method described in Example 1 for other conditions.

Further, the solid phase polymerization temperature and time used were those shown in Table 1 below. Solid phase polymerization was carried out in the same manner as in the above-described Example 2 for other conditions.

The measurements of the items (1) to (10) on the obtained polyamide were performed.

Table 2 shows the measurement results.

Comparative Example 1

896 g (5.20 mol) of (a) CHDA and 604 g (5.20 mol) of (b) 2 MPD were dissolved in 1,500 g of distilled water to produce 50 mass % aqueous solution containing equimolar raw material monomers.

The obtained aqueous solution and 21 g of 2 MPD (0.18 mol) as the additives added during melt polymerization were charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen.

Heating was continued from a solution temperature of about 50° C. until the pressure in the autoclave tank was, in terms of gauge pressure (hereinafter, pressure in the tank is always expressed as gauge pressure), about 2.5 kg/cm$^2$.

While removing water from the system to maintain the pressure in the tank at about 2.5 kg/cm$^2$, heating was continued so that the concentration of the aqueous solution was concentrated to about 85%.

Removal of water was stopped, and then heating was continued until the pressure in the tank was about 30 kg/cm$^2$. While removing water from the system to maintain the pressure in the tank at 30 kg/cm$^2$, heating was continued until 50° C. below the final temperature of the solution temperature.

While heating was further continued, the pressure in the tank was lowered over 60 minutes from 30 kg/cm$^2$ to atmospheric pressure (gauge pressure of 0 kg/cm$^2$). The heater temperature was adjusted so that the final temperature of the solution temperature was 345° C. With the solution temperature in that state, the tank contents were kept for 10 minutes under a reduced pressure of 100 Torr by a vacuum apparatus. Then, the pressure was increased with nitrogen, and the resultant resin was formed into a strand from a lower spinneret (nozzle). This strand was water cooled and cut, and then discharged in pellet form to obtain a polyamide.

The obtained polyamide was dried under a nitrogen flow to adjust the moisture content to less than about 0.2 mass %, and the measurements of the items (1) to (10) were performed.

Table 2 shows the measurement results.

Comparative Example 2

In the above-described Comparative Example 1, the amount of the additives added during melt polymerization was as shown in Table 1 below.

Polyamide polymerization was carried out by the hot melt polymerization method described in Comparative Example 1 except for the above-described condition.

Further, "solid phase polymerization" was carried out by the following method.

10 kg of the polyamide pellets obtained by the melt polymerization was charged into a conical ribbon vacuum dryer (trade name: Ribocone RM-10V, manufactured by Okawara Corporation), and the contents of the dryer were thoroughly purged with nitrogen.

Under a 1 L/minute nitrogen flow, the pellets were heated at 260° C. for 6 hours while stirring.

Then, while continuing to flow with nitrogen, the temperature was decreased. When the temperature reached about 50° C., the pellets were removed as is from the dryer to obtain a polyamide.

The measurements of the items (1) to (10) on the obtained polyamide were performed.

Table 2 shows the measurement results.

Comparative Examples 3 to 5, 7, and 8

As the (a) dicarboxylic acid, the (b) diamine, and the additives added during melt polymerization, the compounds and their amounts shown in Table 1 were used.

The polymerization final temperature was set to that shown in Table 1. Polyamide polymerization was carried out by the hot melt polymerization method described in Comparative Example 1 except for the above-described conditions.

Further, the solid phase polymerization temperature and time were those shown in Table 1 below. Solid phase polymerization was carried out in the same manner as in the solid polymerization described in Comparative Example 2 except for the above-described condition.

The measurements of the items (1) to (10) on the obtained polyamide were performed.

Table 2 shows the measurement results.

Comparative Example 6

As the (a) dicarboxylic acid, the (b) diamine, and the additives added during melt polymerization, the compounds and their amounts shown in Table 1 were used.

The polymerization final temperature was set to that shown in Table 1. Polyamide polymerization was carried out by the hot melt polymerization method described in Comparative Example 1 except for the above-described conditions.

The measurements of the items (1) to (10) on the obtained polyamide were performed.

Table 2 shows the measurement results.

Example 7

The polyamide obtained in Example 1 was used by drying under a nitrogen flow so that the moisture content was adjusted to about 0.2 mass %.

Using a twin-screw extruder (TEM 35, L/D=47.6, (D=37 mmφ), a set temperature Tm2+20° C. (in this case, 327+20=347° C.), a screw revolution speed 300 rpm, manufactured by Toshiba Machine Co., Ltd.), the dried polyamide (100 parts by mass) was fed from a top feed opening provided at the uppermost upstream portion of the extruder. Glass fiber was fed as an inorganic filler in the ratio shown in Table 3 (parts by mass) from a side feed opening on a downstream side of the extruder (the resin fed from the top feed opening was in a sufficiently molten state). A melt kneaded product extruded from a die head was cooled in a strand form, which was pelletized to form a polyamide composition.

Table 3 below shows the measurement results of the items (7), (11), and (12) on the obtained polyamide composition.

The tension rate in the tensile test was 5 mm/min.

Examples 8 to 14

The amounts of the raw material components were as in the proportions shown in Table 3 below. A polyamide composition was obtained in the same manner as in the method described in Example 7 for other conditions.

Table 3 below shows the measurement results of the items (7), (11), and (12) on the obtained polyamide composition.

The tension rate in the tensile test was 5 mm/min.

Comparative Examples 9 to 15

The amounts of the raw material components were as in the proportions shown in Table 3. A polyamide composition was obtained in the same manner as in the method described in Example 7 for other conditions.

Table 3 below shows the measurement results of the items (7), (11), and (12) on the obtained polyamide composition.

The tension rate in the tensile test was 5 mm/min.

TABLE 1

| | | | Example 1 | Example 2 | Example 3 | Example 4 | Example 5 | Example 6 | Comparative Example 1 | Comparative Example 2 |
|---|---|---|---|---|---|---|---|---|---|---|
| polyamide component amount | (a) dicarboxylic acid | type | CHDA | CHDA | CHDA | CHDA | CHDA | CHDA | CHDA | CHDA |
| | | g | 896 | 896 | 896 | 896 | 494 | 689 | 896 | 494 |
| | | mol | 5.20 | 5.20 | 5.20 | 5.20 | 2.87 | 4.00 | 5.20 | 2.87 |
| | | type | | | | | ADA | C12DA | | ADA |
| | | g | | | | | 419 | 230 | | 419 |
| | | mol | | | | | 2.87 | 1.00 | | 2.87 |
| | (b) diamine | type | 2MPD | 2MPD | 2MPD | 2MPD | PMD | 2MPD | 2MPD | PMD |
| | | g | 604 | 604 | 604 | 604 | 586 | 581 | 604 | 586 |
| | | mol | 5.20 | 5.20 | 5.20 | 5.20 | 5.74 | 5.00 | 5.20 | 5.74 |
| | | type | | | | | | | | |
| | | g | | | | | | | | |
| | | mol | | | | | | | | |
| polymerization conditions | additives added during melt polymerization | type | 2MPD | 2MPD | 2MPD | 2MPD | PMD | 2MPD | 2MPD | PMD |
| | | g | 18 | 18 | 18 | 18 | 15 | 10 | 21 | 18 |
| | | mol | 0.16 | 0.16 | 0.16 | 0.16 | 0.14 | 0.09 | 0.18 | 0.17 |
| | | type | | | | acetic acid | | | | |
| | | g | | | | 6 | | | | |
| | | mol | | | | 0.10 | | | | |
| | polymerization final temperature | ° C. | 220 | 220 | 240 | 220 | 220 | 220 | 345 | 355 |
| | solid phase polymerization temperature | ° C. | none | 260 | none | 260 | none | none | none | 240 |

TABLE 1-continued

| | | | | | | | | |
|---|---|---|---|---|---|---|---|---|
| solid phase polymerization time | | h | 6 | 6 | | | | 12 |

| | | | | Comparative Example 3 | Comparative Example 4 | Comparative Example 5 | Comparative Example 6 | Comparative Example 7 | Comparative Example 8 |
|---|---|---|---|---|---|---|---|---|---|
| polyamide component amount | (a) dicarboxylic acid | | type | CHDA | | | | | CHDA |
| | | | g | 689 | | | | | 750 |
| | | | mol | 4.00 | | | | | 4.35 |
| | | | type | C12DA | ADA | ADA | TPA | TPA | |
| | | | g | 230 | 883 | 883 | 883 | 883 | |
| | | | mol | 1.00 | 6.04 | 6.04 | 5.31 | 5.31 | |
| | (b) diamine | | type | 2MPD | PMD | PMD | 2MPD | 2MPD | C10DA |
| | | | g | 581 | 617 | 617 | 370 | 370 | 750 |
| | | | mol | 5.00 | 6.04 | 6.04 | 3.19 | 3.19 | 4.35 |
| | | | type | | | | HMD | HMD | |
| | | | g | | | | 247 | 247 | |
| | | | mol | | | | 2.13 | 2.13 | |
| polymerization conditions | additives added during melt polymerization | | type | 2MPD | PMD | PMD | 2MPD | 2MPD | C10DA |
| | | | g | 14 | 9 | 9 | 11 | 11 | 15 |
| | | | mol | 0.12 | 0.09 | 0.09 | 0.10 | 0.10 | 0.09 |
| | | | type | | | | | | |
| | | | g | | | | | | |
| | | | mol | | | | | | |
| | polymerization final temperature | | °C. | 305 | 270 | 320 | 220 | 340 | 360 |
| | solid phase polymerization temperature | | °C. | 240 | none | none | none | none | None |
| | solid phase polymerization time | | h | 12 | | | | | |

TABLE 2

| | | | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|---|---|
| (a) dicarboxylic acid | type | | CHDA | CHDA | CHDA | CHDA | CHDA | CHDA | CHDA | CHDA | CHDA | — | — | — | — | CHDA |
| | mol % in (a) | | 100 | 100 | 100 | 100 | 50 | 80 | 100 | 50 | 80 | — | — | — | — | 100 |
| | type | | — | — | — | — | ADA | C12DA | — | ADA | C12DA | ADA | ADA | TPA | TPA | — |
| | mol % in (a) | | — | — | — | — | 50 | 20 | — | 50 | 20 | 100 | 100 | 100 | 100 | — |
| (b) diamine | type | | 2MPD | 2MPD | 2MPD | 2MPD | PMD | 2MPD | 2MPD | PMD | 2MPD | PMD | PMD | 2MPD | 2MPD | C10DA |
| | mol % in (b) | | 100 | 100 | 100 | 100 | 100 | 100 | 100 | 100 | 100 | 100 | 100 | 60 | 60 | 100 |
| | type | | — | — | — | — | — | — | — | — | — | — | — | HMD | HMD | — |
| | mol % in (b) | | — | — | — | — | — | — | — | — | — | — | — | 40 | 40 | — |
| melting point Tm2 | °C. | | 329 | 334 | 330 | 329 | 336 | 288 | 327 | 334 | 285 | 254 | 254 | 310 | 310 | 334 |
| color tone (b value) | | | 1.1 | 1.2 | 1.4 | 1.0 | 1.6 | 1.2 | 1.4 | 1.6 | 1.3 | 1.2 | 1.3 | 3.6 | 3.8 | 1.4 |
| sulfuric acid relative viscosity ηr at 25° C. | | | 2.4 | 3.9 | 2.5 | 2.3 | 3.1 | 2.8 | 2.5 | 3.1 | 3.0 | 3.1 | 3.2 | 2.3 | 2.2 | 3.1 |
| cyclic amino end content | μ equivalents/g | | 6 | 8 | 25 | 5 | 7 | 6 | 40 | 38 | 37 | 9 | 35 | 11 | 64 | 0 |
| {total molecular chain end group content − amino end content}/total molecular chain end group content | | | 0.57 | 0.61 | 0.60 | 0.92 | 0.55 | 0.61 | 0.54 | 0.58 | 0.55 | 0.40 | 0.55 | 0.61 | 0.56 | 0.44 |
| properties of polyamide | maintenance ratio ηr at dwell | % | 91 | 90 | 85 | 91 | 89 | 93 | 78 | 83 | 81 | 78 | 77 | 78 | 75 | 95 |
| | deflection temperature under load (0.46 MPa) | °C. | 195 | 201 | 189 | 199 | 171 | 135 | 152 | 147 | 119 | 188 | 188 | 225 | 224 | 173 |
| | heat resistant color tone stability | | ◯ | ◯ | ◯ | ◎ | ◯ | ◯ | X | X | X | ◎ | ◎ | X | X | ◎ |
| | heat resistant reflow property | | ◎ | ◎ | ◎ | ◎ | ◎ | ◯ | ◎ | ◎ | ◯ | X | X | ◎ | ◎ | ◎ |
| | fogging property | | ◎ | ◎ | ◯ | ◎ | ◎ | ◎ | X | X | X | ◯ | X | ◯ | X | X |

TABLE 3

| | | | Example 7 | Example 8 | Example 9 | Example 10 | Example 11 | Example 12 | Example 13 | Example 14 | Comparative Example 9 Comparative Example 1 | Comparative Example 10 Comparative Example 2 | Comparative Example 11 Comparative Example 3 | Comparative Example 12 Comparative Example 4 | Comparative Example 13 Comparative Example 5 | Comparative Example 14 Comparative Example 6 | Comparative Example 15 Comparative Example 7 |
|---|---|---|---|---|---|---|---|---|---|---|---|---|---|---|---|---|---|
| polyamide | (a) dicarboxylic acid | type | CHDA | CHDA | CHDA | CHDA | CHDA | CHDA | CHDA | CHDA | CHDA | CHDA | CHDA | — | — | — | — |
| | | mol % in (a) | 100 | 100 | 100 | 100 | 50 | 80 | 100 | 100 | 100 | 50 | 80 | — | — | — | — |
| | | type | — | — | — | — | ADA | C12DA | — | — | — | ADA | C12DA | ADA | ADA | TPA | TPA |
| | | mol % in (a) | — | — | — | — | 50 | 20 | — | — | — | 50 | 20 | 100 | 100 | 100 | 100 |
| | (b) diamine | type | 2MPD | 2MPD | 2MPD | 2MPD | PMD | 2MPD | 2MPD | 2MPD | 2MPD | PMD | 2MPD | PMD | PMD | 2MPD | 2MPD |
| | | mol % in (b) | 100 | 100 | 100 | 100 | 100 | 100 | 100 | 100 | 100 | 100 | 100 | 100 | 100 | 60 | 60 |
| | | type | — | — | — | — | — | — | — | — | — | — | — | — | — | HMD | HMD |
| | | mol % in (b) | — | — | — | — | — | — | — | — | — | — | — | — | — | 40 | 40 |
| | polyamide | part by mass | 100 | 100 | 100 | 100 | 100 | 100 | 100 | 100 | 100 | 100 | 100 | 100 | 100 | 100 | 100 |
| | GF | part by mass | 100 | 100 | 100 | 100 | 100 | 100 | 50 | 80 | 100 | 100 | 100 | 100 | 100 | 100 | 100 |
| | wollastonite | part by mass | | | | | | | 50 | 20 | | | | | | | |
| properties of polyamide composition | tensile strength | MPa | 253 | 267 | 254 | 251 | 261 | 257 | 228 | 263 | 251 | 262 | 260 | 235 | 235 | 200 | 201 |
| | heat resistant color tone stability | | ○ | ○ | ○ | ⊚ | ○ | ○ | ○ | ○ | X | X | X | ⊚ | ⊚ | X | X |
| | number of foreign particles due to die-lip buildup | number/ 5 kg | 1 | 1 | 2 | 0 | 2 | 1 | 1 | 1 | 3 | 6 | 3 | 9 | 12 | 6 | 7 |

As is clear from the results in Table 2, the polyamides of Examples 1 to 6 had excellent properties for each of heat resistance, stability under heating, heat resistant color tone stability, heat resistant reflow property, fogging property, and a high melting point.

Particularly, the polyamide of Example 4 satisfying 0.70<{total molecular chain end group content−amino end content}/total molecular chain end group content<1.00 had excellent properties.

In contrast, Comparative Examples 1, 2, and 3, which had a cyclic amino end content exceeding 30μ equivalents/g, were insufficient in terms of heat resistant color tone stability, fogging property, and strength.

It became clear that the polyamides containing adipic acid and pentamethylenediamine of Comparative Examples 4 and 5 had excellent heat resistant color tone stability without depending on the cyclic amino end content, and had no problem for color tone stability during processing in a conventional polyamide having a low processing temperature, like these Comparative Examples.

Further, as is clear from the results of Table 3, the polyamide compositions of Examples 7 to 14 had excellent properties in terms of strength, heat resistant color tone stability, and fabricability. In contrast, the polyamide compositions of Comparative Examples 9 to 15 were insufficient in terms of these.

The present application is based on a Japanese patent application filed with the Japan Patent Office on Mar. 15, 2011 (Japanese Patent Application No. 2011-056745), whose contents are hereby incorporated by reference herein.

INDUSTRIAL APPLICABILITY

The polyamide and polyamide composition according to the present invention are industrially applicable as molding materials for various components, such as in automobile uses, electric and electronic uses, industrial materials, and daily and household products.

The invention claimed is:

1. A polyamide obtained by polymerizing:
(a) a dicarboxylic acid containing at least 50 mol % of an alicyclic dicarboxylic acid; and
(b) a diamine containing at least 50 mol % of a diamine having a pentamethylenediamine skeleton,
wherein the polyamide has a cyclic amino end content of 2 to 15μ equivalents/g.

2. The polyamide according to claim 1, wherein the polyamide has a melting point of 280° C. or more and 350° C. or less.

3. The polyamide according to claim 1, wherein the polyamide has a sulfuric acid relative viscosity ηr at 25° C. of 2.3 or more.

4. The polyamide according to claim 1, wherein the polyamide satisfies the following expression (1)

0.70<{a total molecular chain end group content−an amino end content}/(a total molecular chain end group content)<1.0.

5. The polyamide according to claim 1, wherein the cyclic amino end is formed by a cyclization reaction of a diamine having a pentamethylenediamine skeleton.

6. The polyamide according to claim 1, wherein the polyamide is obtained by a solid phase polymerization step in at least a part of a polymerization step.

7. A polyamide composition comprising: a polyamide according to claim 1; and
an inorganic filler.

8. The polyamide composition according to claim 7, wherein the inorganic filler is a reinforced fiber having a weight average fiber length of 1 to 15 mm.

9. The polyamide according to claim 1, wherein the polyamide is obtained by
using (a) a dicarboxylic acid containing at least 50 mol % of an alicyclic dicarboxylic acid, and (b) a diamine containing at least 50 mol % of a diamine having a pentamethylenediamine skeleton, and
carrying out a polymerization step in which the ultimate pressure is 10 kg/cm$^2$ or more and the final temperature of the polymerization is a reaction temperature less than the melting point of the polyamide.

10. The polyamide according to claim 2, wherein the polyamide has a sulfuric acid relative viscosity ηr at 25° C. of 2.3 or more.

11. The polyamide according to claim 2, wherein the polyamide satisfies the following expression (1)

0.70<{a total molecular chain end group content−an amino end content}/(a total molecular chain end group content)<1.0.

12. The polyamide according to claim 2, wherein the cyclic amino end is formed by a cyclization reaction of a diamine having a pentamethylenediamine skeleton.

13. The polyamide according to claim 2, wherein the polyamide is obtained by a solid phase polymerization step in at least a part of a polymerization step.

14. A polyamide composition comprising:
a polyamide according to claim 2; and
an inorganic filler.

15. The polyamide composition according to claim 14, wherein the inorganic filler is a reinforced fiber having a weight average fiber length of 1 to 15 mm.

16. The polyamide according to claim 2, wherein the polyamide is obtained by using
(a) a dicarboxylic acid containing at least 50 mol % of an alicyclic dicarboxylic acid, and
(b) a diamine containing at least 50 mol % of a diamine having a pentamethylenediamine skeleton, and
carrying out a polymerization step in which the ultimate pressure is 10 kg/cm$^2$ or more and the final temperature of the polymerization is a reaction temperature less than the melting point of the polyamide.

17. A method for producing a polyamide comprising a polymerization step of polymerizing:
(a) a dicarboxylic acid containing at least 50 mol % of an alicyclic dicarboxylic acid; and
(b) a diamine containing at least 50 mol % of a diamine having a pentamethylenediamine skeleton,
wherein, in the polymerization step, the ultimate pressure is 10 kg/cm$^2$ or more and the final temperature of the polymerization is a reaction temperature less than the melting point of the polyamide,
to produce a polyamide having a cyclic amino end content of 2 to 15μ equivalents/g.

* * * * *